(12) United States Patent
Baca

(10) Patent No.: US 12,053,010 B2
(45) Date of Patent: Aug. 6, 2024

(54) CHILE ROASTER

(71) Applicant: Baca's Metalworks, LLC, Las Cruces, NM (US)

(72) Inventor: Robert Baca, Las Cruces, NM (US)

(73) Assignee: RYLANS ENTERPRISES LLC, Las Cruces, NM (US)

(*) Notice: Subject to any disclaimer, the term of this patent is extended or adjusted under 35 U.S.C. 154(b) by 1414 days.

(21) Appl. No.: 16/392,465

(22) Filed: Apr. 23, 2019

(65) Prior Publication Data

US 2019/0320701 A1 Oct. 24, 2019

Related U.S. Application Data

(60) Provisional application No. 62/661,251, filed on Apr. 23, 2018.

(51) Int. Cl.
*A23N 12/08* (2006.01)
*F24C 3/08* (2006.01)

(52) U.S. Cl.
CPC ............. *A23N 12/08* (2013.01); *F24C 3/087* (2013.01)

(58) Field of Classification Search
CPC ........ A23N 12/08; A23N 12/125; F24C 3/087
USPC ........................................................ 99/443
See application file for complete search history.

(56) References Cited

U.S. PATENT DOCUMENTS

| | | | |
|---|---|---|---|
| 1,135,700 A * | 4/1915 | Kohlmeyer | F24C 3/103 126/39 G |
| 2,569,656 A * | 10/1951 | Chissom | A23L 3/022 99/360 |
| 3,353,477 A * | 11/1967 | Wilhelm | A47J 27/0817 99/360 |
| 4,088,436 A * | 5/1978 | Alferes | F23K 5/00 431/278 |
| 4,389,562 A | 6/1983 | Chaudoir | |
| 4,479,776 A * | 10/1984 | Smith | A23L 3/185 219/400 |
| 4,554,437 A | 11/1985 | Wagner et al. | |
| 4,569,658 A | 2/1986 | Wiggins et al. | |
| 5,231,920 A | 8/1993 | Alden et al. | |
| 5,421,318 A | 6/1995 | Unruh et al. | |
| 5,479,915 A * | 1/1996 | Riener | F24B 1/1808 126/502 |
| 5,560,285 A | 10/1996 | Moreth | |

(Continued)

FOREIGN PATENT DOCUMENTS

| | | | |
|---|---|---|---|
| CN | 108308650 A * | 7/2018 | |
| CN | 108378395 A * | 8/2018 | A23N 12/08 |

*Primary Examiner* — Nathaniel E Wiehe
*Assistant Examiner* — Ket D Dang
(74) *Attorney, Agent, or Firm* — LOZA & LOZA, LLP; Kevin L. Soules

(57) ABSTRACT

A method, system, and apparatus for roasting product such as chile comprises an inner roasting chamber, an exterior housing, housing the inner roasting chamber, a fixed engagement between the inner roasting chamber and the exterior housing on a burner end of the roaster system, an end cap fitting on a product exit end of the roaster system such that the inner roasting chamber can expand and contract within the exterior housing, a conveyor assembly comprising a conveyor belt, a motor configured to drive the conveyor belt, and a tensioning mechanism to adjust tension in the conveyor belt, and a gas distribution assembly connected to at least one burner.

10 Claims, 25 Drawing Sheets

(56) References Cited

U.S. PATENT DOCUMENTS

| | | | |
|---|---|---|---|
| 5,562,022 A | 10/1996 | Schmid et al. | |
| 5,799,569 A | 9/1998 | Moreth | |
| 6,178,877 B1 | 1/2001 | Samuelson | |
| 6,526,961 B1 | 3/2003 | Hardenburger | |
| 7,520,211 B2 * | 4/2009 | Hunot | A47J 37/048 |
| | | | 99/341 |
| 8,567,099 B2 | 10/2013 | Bai et al. | |
| 8,857,323 B1 * | 10/2014 | Alkadban | A47J 37/0786 |
| | | | 99/449 |
| 9,476,638 B1 * | 10/2016 | Tyler | A45C 5/14 |
| 2006/0011607 A1 * | 1/2006 | Cho | F24C 15/327 |
| | | | 219/400 |
| 2007/0014906 A1 | 1/2007 | Leon | |
| 2008/0245359 A1 | 10/2008 | Williamson | |

* cited by examiner

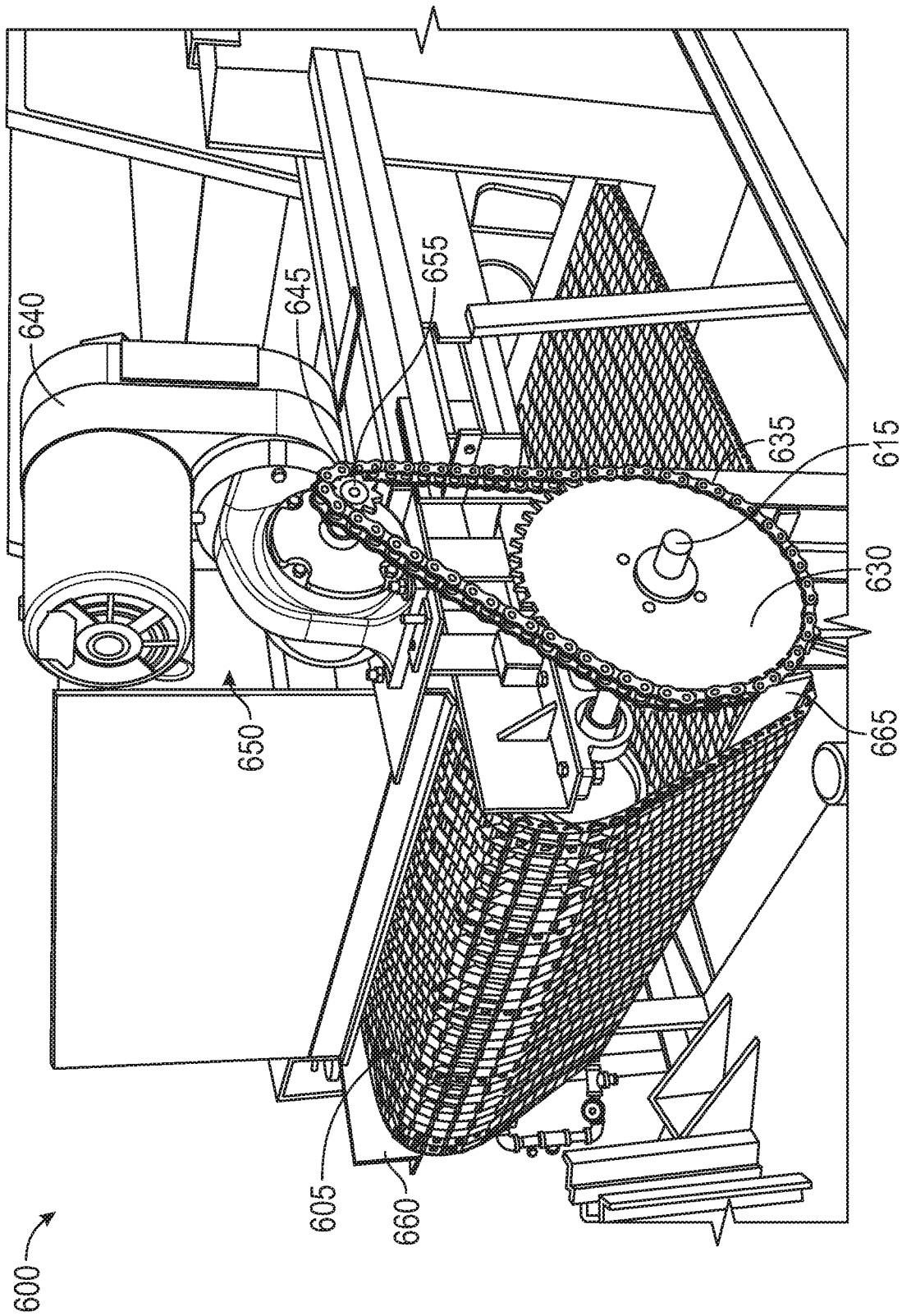

CHILE ROASTER

CROSS REFERENCE TO RELATED PATENT APPLICATIONS

This patent application claims the priority and benefit under 35 U.S.C. § 119(e) of U.S. Provisional Patent Application Ser. No. 62/661,251, filed Apr. 23, 2018, entitled "CHILE ROASTER." U.S. Provisional Patent Application Ser. No. 62/661,251 is herein incorporated by reference in its entirety.

TECHNICAL FIELD

Embodiments are generally related to roasters. Embodiments are further related to industrial ovens. Embodiments are related to conveyor-based roasters. Embodiments are also related to chile roasters. Embodiments are further related to methods and systems for manufacturing chile roasters and ovens. Embodiments are additionally related to methods and systems for roasting chile, that incorporate expendable elements to improve roaster safety and efficacy.

BACKGROUND

Chile is harvested with a thick outer skin that is unpleasant to eat. In addition, roasting chile can alter the taste, by caramelizing the sugars on the surface, resulting in a more complex and desirable flavor. Thus, a preferable means for preparing chile for consumption involves roasting the chile. However, prior art approaches to roasting chile are very time consuming and inefficient. Likewise, prior art approaches for roasting chile leave the skin in a condition that is difficult to remove.

Furthermore, current methods for roasting chile require the use of unsanitary roasting systems. The systems are generally formed of parts that expand when heated. The thermal expansion and contraction can result in cracks in the structure. These cracks present spaces where food particles can get stuck and decay, resulting in the proliferation of unwanted microbial growth. Many current chile roasters do not comply with US Food and Drug Administration ("FDA") standards for food preparation equipment.

Accordingly, there is a need in the art for improved methods, systems, and apparatuses for roasters, and in particular, chile roasters, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for roasting products.

It is another aspect of the disclosed embodiments to move product through a roaster.

It is another aspect of the disclosed embodiments to provide a method and system for roasting chile with an oven.

It is another aspect of the disclosed embodiments to provide methods, systems, and apparatuses for roasting large volumes of chile.

It is yet another aspect of the disclosed embodiments to provide methods, systems, and apparatuses for providing sanitary food grade chile roasters that comply with regulations for food preparation equipment.

The aforementioned aspects and other objectives and advantages can now be achieved as described herein. In one embodiment, a system and/or apparatus comprises an inner roasting chamber, an exterior housing, housing the inner roasting chamber such that the inner roasting chamber can expand and contract, a conveyor assembly, and a gas distribution assembly connected to at least one burner.

In an embodiment, the roaster system further comprises at least one burner tube connected to the at least one burner with a burner support tab. In an embodiment, the burner tube further comprises: a plurality of apertures, and a burner tube end cap formed on the burner tube.

In an embodiment, the roaster system further comprises at least one heat deflector baffle formed in the inner roasting chamber.

In an embodiment, the conveyor assembly further comprises: a conveyor belt, a motor configured to drive the conveyor belt, and a tensioning mechanism to adjust tension in the conveyor belt. In an embodiment the tensioning mechanism further comprises an automatic tensioning mechanism.

In an embodiment, the roaster system is formed of stainless steel.

In an embodiment, the roaster system further comprises a fixed engagement between the inner roasting chamber and the exterior housing on a burner end of the roaster system, and an end cap fitting on a product exit end of the roaster system.

In an embodiment, the roaster system further comprises insulation formed between the inner roasting chamber and the exterior housing.

In an embodiment, the gas distribution system further comprises a gas source, a master conduit connected to the gas source, and an output conduit connecting the master conduit to the burner.

In another embodiment, a roaster system and/or apparatus comprises an inner roasting chamber, an exterior housing, housing the inner roasting chamber such that the inner roasting chamber can expand and contract, a burner, frame, and conveyor assembly formed in the inner roasting chamber, and a gas distribution assembly connected to at least one burner.

In an embodiment the roaster system the burner, frame, and conveyor assembly further comprises a frame for holding at least one burner tube, and a plurality of wheels attached to the frame wherein the frame can be removed from the inner roasting chamber.

In an embodiment, the roaster system further comprises at least one stop formed on the inner roasting chamber. In an embodiment, the roaster system further comprise a removable cover. In an embodiment, the roaster system further comprises a temperature port formed in the roaster system.

In an embodiment, the roaster system the corners and joints in the inner roasting chamber are formed with a radius and are smooth.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 6A depicts a motor driven conveyor belt assembly, in accordance with an embodiment;

DETAILED DESCRIPTION

Figure 1:
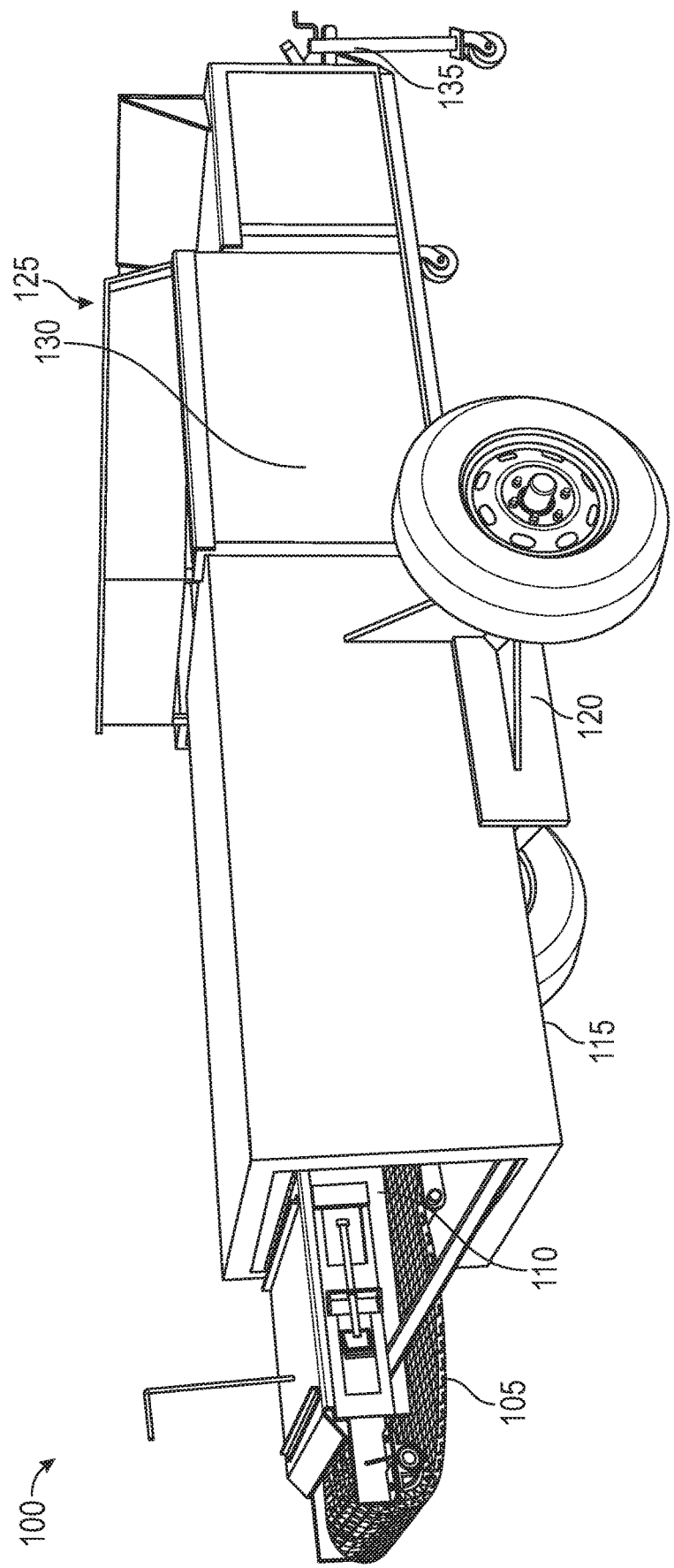
FIG. 1 depicts a roaster, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments disclosed herein are drawn to methods, systems, and apparatuses for roasters, and in particular chile roasters. Thus, while the embodiments may be described as "chile roasters," it should be understood that in other embodiments, the various methods and systems disclosed herein can be used for roasting other products, including food products.

The roasters disclosed herein use a conveyor belt system or assembly to move product through an inner roasting chamber. The conveyor belt assembly draws the product through the inner roasting chamber (e.g. oven) where one or more gas fired burners are used to roast the product as it passes. The distance between the conveyor belt and the top of the oven must be carefully selected. A layer of steam can develop on the top of the oven from the moisture loss of the product (most commonly chile) as it reaches its boiling point. While the oven can reach temperatures in excess of 1000 degrees, the top layer of steam can never exceed the boiling point (212 degrees). Therefore, the height of the product, and thus the conveyor belt assembly in the roaster, needs to be selected to ensure the product passes through the region of higher heat in the oven, in order to produce the best result. In certain embodiments, the height can be selected according to product type, and can be adjusted accordingly, during fabrication as disclosed herein.

The methods and systems disclosed herein provide a means for allowing for the expansion of the oven components as they experience thermal expansion. The inner roasting chamber is configured to freely move toward the output side of the roaster which prevents cracking during thermal expansion and contraction. Furthermore, the inner roasting chamber being independent of the exterior housing also allows for better ventilation. The embodiments disclosed herein are further configured to be completely sanitizable.

The embodiments disclosed herein further address the thermal expansion and contraction of the conveyor belt system by utilizing the expansion of the inner roasting chamber assembly to help tension the conveyor belt, which undergoes tremendous expansion due to the high heat output from the burners in the over. A lever mechanism is used to take advantage of this expansion to continually tension the belt as it expands, and therefore allow for a smaller adjustment mechanism which can be sanitized before and after operation. The embodiments disclosed herein meet all current FDA guidelines for sanitizing equipment.

For example, FIG. 1 illustrates a roaster 100 in accordance with the disclosed embodiments. As shown in FIG. 1, the roaster 100 can generally include a conveyor belt assembly 105 that runs through an inner roasting chamber 110 (or oven). The inner roasting chamber 110 can be surrounded by insulation, and an exterior housing 115. The roaster 100 can be affixed to an axle and wheel assembly 120 and can be configured with a hitch such that the roaster 100 can be connected to a vehicle for towing. The top of the roaster includes a hopper 125 where product, such as raw chile, can be fed to the conveyor belt assembly 105. The conveyor belt assembly 105 draws the product through the inner roasting chamber 110 where an associated set of gas or propane fired burners are used to roast product passing through the roaster 100.

Figure 2:
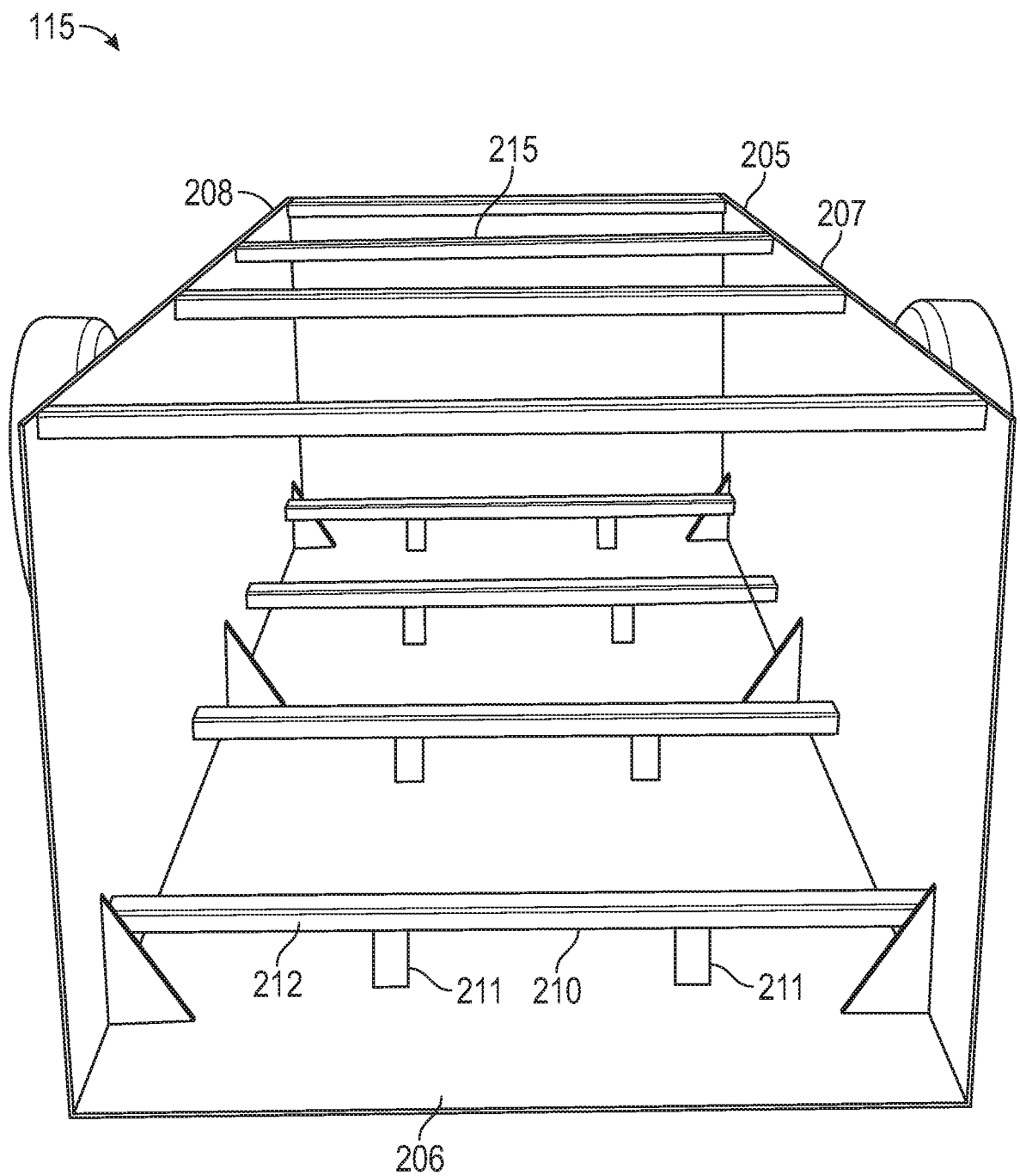
FIG. 2 depicts a partially assembled exterior housing in accordance with the disclosed embodiments.

FIG. 2 illustrates details of the exterior housing 115. The exterior housing 115 comprises a three-walled box structure 205, including a bottom 206, a side wall 207 and a second side wall 208. The bottom 206 includes a series of one or more lower supports 210 for the inner roasting chamber 110. The lower supports 210 include at least two vertical risers 211 and a cross beam 212 connected to the top of the vertical risers 211, and connected to side wall 207 and side wall 208. Temporary upper bars 215 can be installed along the top open side 209 of the three-walled box structure 205 to hold its shape during fabrication.

Figure 3A:
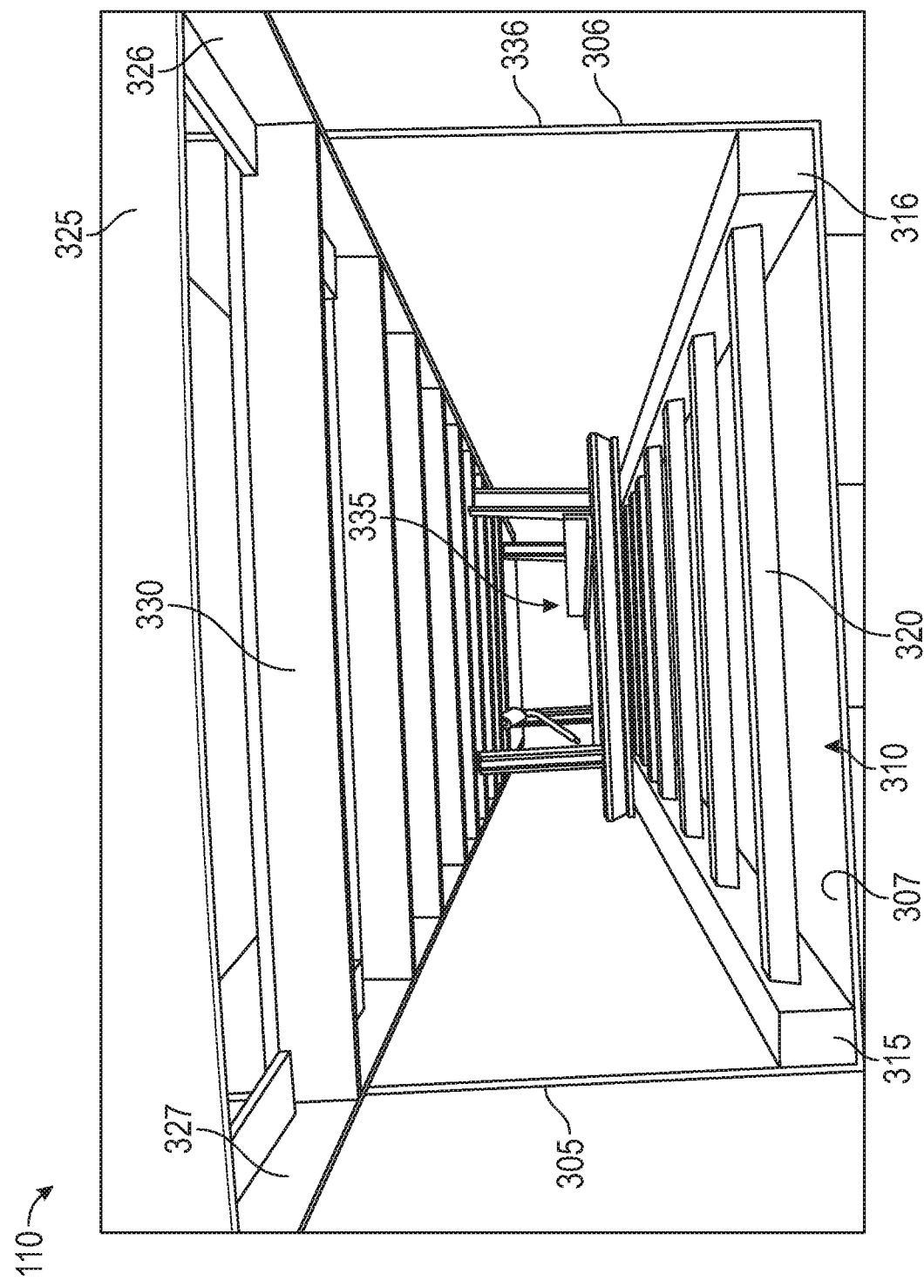
FIG. 3A depicts an elevation view of a partially assembled inner roasting chamber, in accordance with the disclosed embodiments.

FIG. 3A illustrates an elevation view of the partially assembled inner roasting chamber 110. The inner roasting chamber 110 includes vertical side wall 305, vertical side wall 306 and bottom 307.

The inner roasting chamber 110 includes a lower conveyor support assembly 310 that serves as support for the lower side of the conveyor belt assembly 105, as well as providing support for various structures associated with the burner assembly. The lower conveyor support assembly 310 includes guide rail 315 and guide rail 316 which are smooth rails with a flat upper surface that run along the length of the inner roasting chamber 110 at the interface between the vertical side wall 305 and bottom 307, and vertical side wall 306 and bottom 307 respectively. A series of cross braces 320 can be intermittently formed between the guide rail 315 and guide rail 316. The number of cross braces 320 can be selected according to the design parameters and size of the roaster 100.

The inner roasting chamber 110 further includes upper conveyor belt support 325 that can be connected to the upper edge of vertical side wall 305 and vertical side wall 306. It should be noted that the upper conveyor belt support 325, include a wall mounted base 326 on vertical side wall 306 and a wall mounted base 327 on vertical side wall 305. The wall mounted bases can comprise L-shaped pieces of material with the flat side facing upward to interface with the conveyor belt. The upper conveyor belt supports 325 further include a plurality of cross braces 330 intermittently formed between the wall mounted base 326 and wall mounted base 327. The number of cross braces 330 can be selected according to the design parameters and size of the roaster 100.

The upper conveyor belt support 325 can extend beyond the burner end 335 and product exit end 336 of the inner roasting chamber 110, in order to facilitate collection of product. The location of the upper conveyor belt support 325 can be selected to ensure that the product passes through the optimally hot area of the inner roasting chamber 110, as discussed above.

Figure 3B:
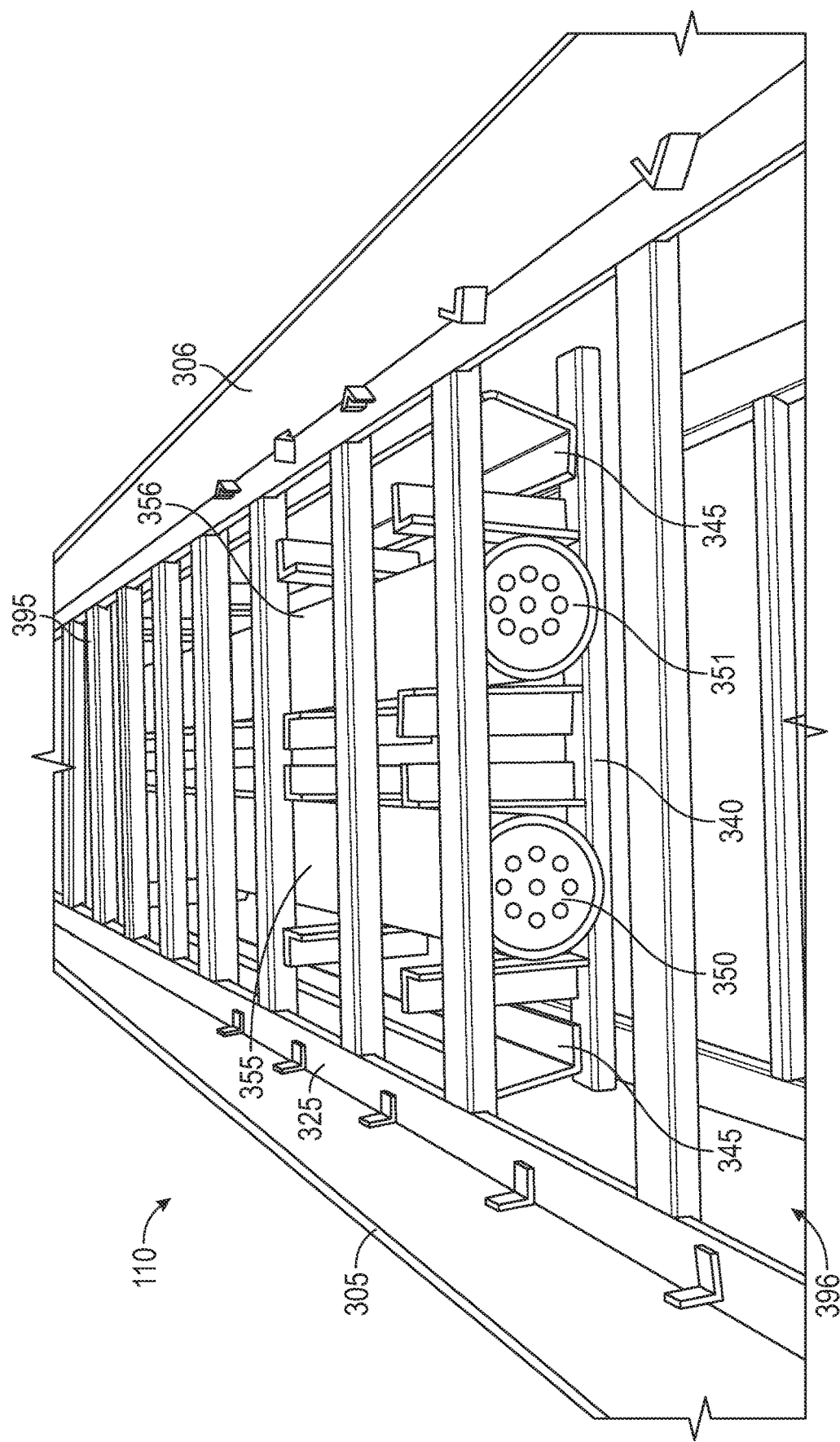
FIG. 3B depicts a partially assembled inner roasting chamber, in accordance with the disclosed embodiments.

The inner roasting chamber 110 further includes burner supports 340 that can be installed on the lower conveyor support assembly 310. As illustrated in FIG. 3B, the burner supports 340 are configured to hold burner tubes including burner tube 355 and burner tube 356. One end of the burner tube 355 is capped with a burner tube end cap 350 and an end of the burner tube 356 is capped by tuner tube end cap 351. The burner tube caps can be welded to the burner tubes and can have a series of apertures formed therein. It should be appreciated that in other embodiments, more or fewer burner tubes can be used.

Heat deflector baffles 345 can be installed against the vertical side wall 305 and vertical side wall 306. The heat deflector baffles 345 are sized to run along the walls parallel to the burner tube 355 and burner tube 356. The heat deflector baffles 345 direct heat away from the sidewalls of the inner roasting chamber 110 and back toward the conveyor belt assembly 105 where product is passing. It should be noted that the heat deflector baffles 345 are configure approximately evenly with the burner tubes so that the respective heat deflector baffles 345 are immediately between the burner tube and the inner roasting chamber 110 sidewalls.

Figure 3C:
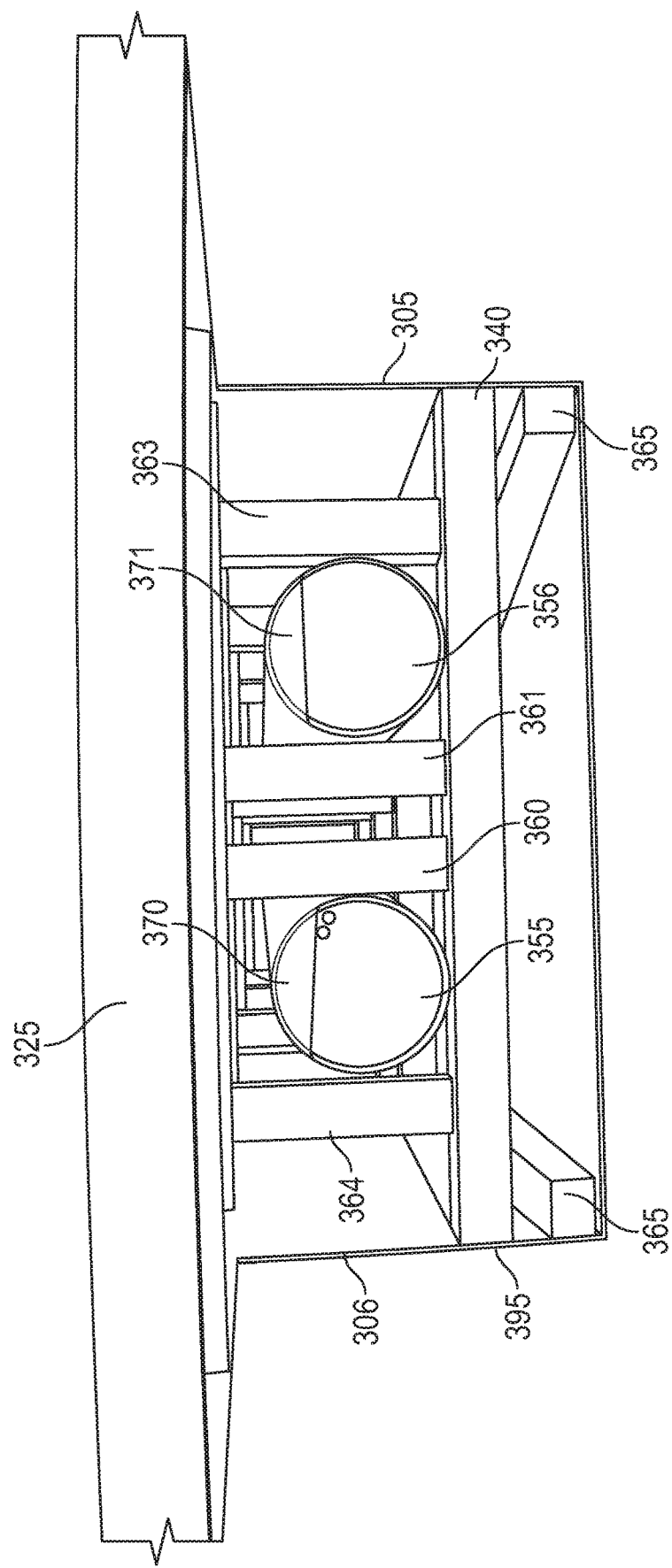
FIG. 3C depicts an elevation view of a partially assembled inner roasting chamber, in accordance with the disclosed embodiments.

FIG. 3C illustrates an elevation view of the inner roasting chamber 110 with the burner tubes installed at the burner end 335 of the inner roasting chamber 110. As illustrated, the burner supports 340 include cross braces, such as cross brace 362, which is connected to vertical side wall 305 and vertical side wall 306, upon which the burner tubes are positioned. Support posts include support post 360, support post 361, support post 363, and support post 364 extended between the cross brace 362, and cross brace 330 of the upper conveyor belt supports 325. The cross brace 362 along with the support posts form a framework around the burner tubes 355 and 356. It should be appreciated that multiple burner supports 340 can be installed at a desired interval along the inside of the inner roasting chamber 110 to support the burner tubes 355 and 356.

The space between the cross braces, such as cross brace 362 and the guide rail 315 and guide rail 316 form a conveyor slot 365 through which a conveyor belt can travel. Additional details associated with conveyor belt assembly 105 are provided herein.

The end of burner tube 355 can include a burner support tab 370, and burner tube 356 can be include burner support tab 371. The burner support tabs aid in mounting burners of the roaster 100 as further detailed herein.

Each of burner tube 355 and burner tube 356 comprises a steel tube configured with a series of apertures. The apertures can be configured in a desired pattern, and with a desired shape, in order to properly diffuse the flame and/or heat emanating from the burner. In certain embodiments, the burner tube can be a cylindrical tube with a pattern of holes on the side of the tube facing the conveyor belt assembly 105 where product is passing. The burner tubes fit in the inner roasting chamber 110 as illustrated in FIG. 3B and FIG. 3C.

Each of burner tube 355 and burner tube 356 can be fitted with a burner tube end cap, such as burner tube end cap 350 and burner tube end cap 351. The burner tube end caps can be welded to one end of each burner tube. The opposing end of the burner tube 355 and burner tube 356 can be fitted with burner support tab 370 and burner support tab 371, which can also be welded into place. The support tabs provide a mounting position for the burners on the burner tubes 355 and 356.

It should be understood that one or more burner tube can be installed along the inner roasting chamber as shown. The burner tubes can be placed between vertical support posts in the inner roasting chamber. In certain embodiments, the burner tubes can be welded to the burner support structure, as illustrated. FIGS. 3B-3C illustrates the use of two burners but in other embodiments, fewer or additional burner tubes can be installed in the inner roasting chamber according to design considerations. For example, the capacity of the roaster can be increased by including additional burners and extending the roaster size.

A pullout tray 395 (illustrated in FIG. 5B) can be inserted along the bottom of the inner roasting chamber 110. The pullout tray 395, along with other components of the roaster 100, can preferably be fabricated with stainless steel in order to meet with mandated sanitation requirements. The pullout tray 395 is removable and thus provides the ability to clean the interior of the inner roasting chamber 110, again, in order to comply with sanitation standards.

Figure 3D:
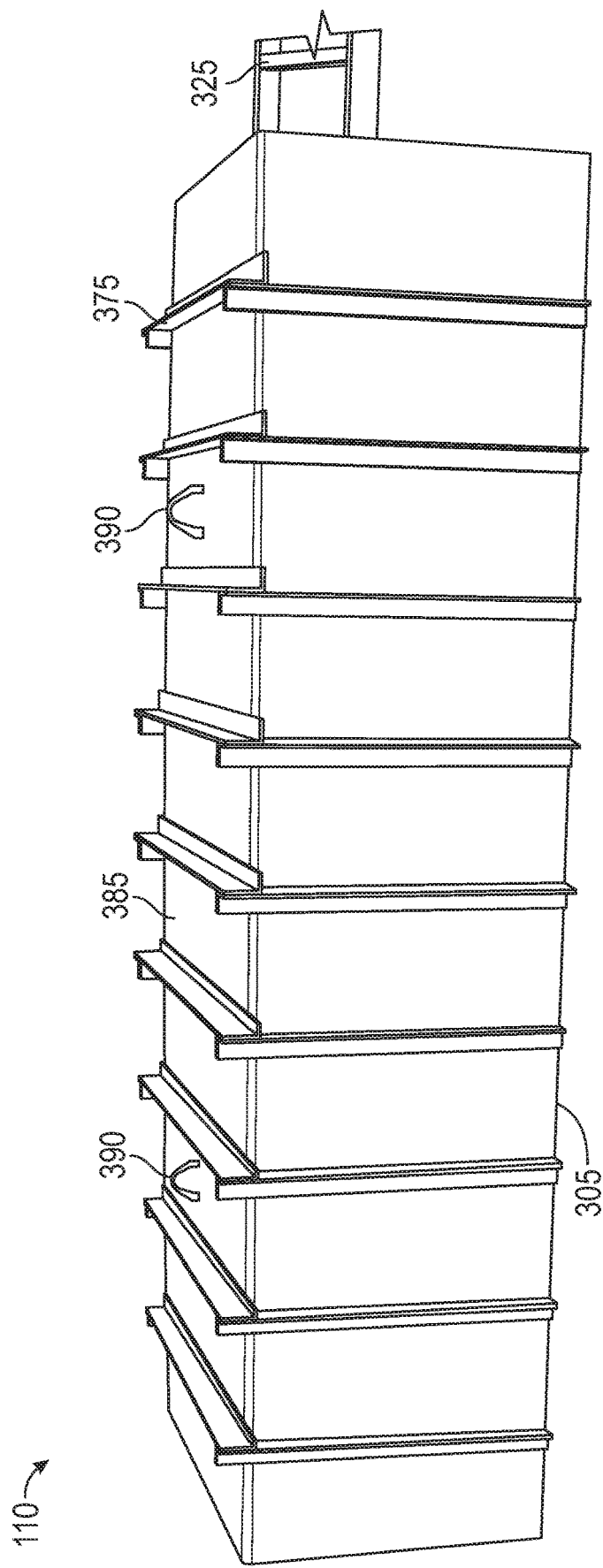
FIG. 3D depicts an inner roasting chamber, in accordance with the disclosed embodiments.

FIG. 3D illustrates a support structure 375 configured on the exterior 380 of the inner roasting chamber 110. It should be noted that a lip or top sheet 385 can be welded to enclose the top of the inner roasting chamber 110 as shown. The support structure 375 comprises welded angle iron, or equivalent structural members, connected to the exterior of vertical sidewall 305 and vertical sidewall 306, and along the top sheet 385 of the exterior of the inner roasting chamber 110. A series of such support structures 375 can be configured along the inner roasting chamber 110. Connection rings 390 can also be provided on the top sheet 385. It should be noted that reinforcement members are not formed on the bottom of the inner roasting chamber so as to accommodate linear expansion of the outer housing as it experiences thermal expansion and contraction during operations.

FIG. 2 illustrates details of the exterior housing 115 which comprises the three-walled box structure 205, including a bottom 206, a side wall 207 and a second side wall 208, and a series of one or more lower supports 210 for the inner roasting chamber 110. The exterior housing 115 is further illustrated in FIG. 4. As shown, the exterior housing 115 houses the inner roasting chamber 110, which can be set into the exterior housing. A top sheet 220 to the exterior housing 115 can be added after the inner roasting chamber 110 is fitted into the exterior housing 115 as shown in FIG. 4C.

Figure 4A:
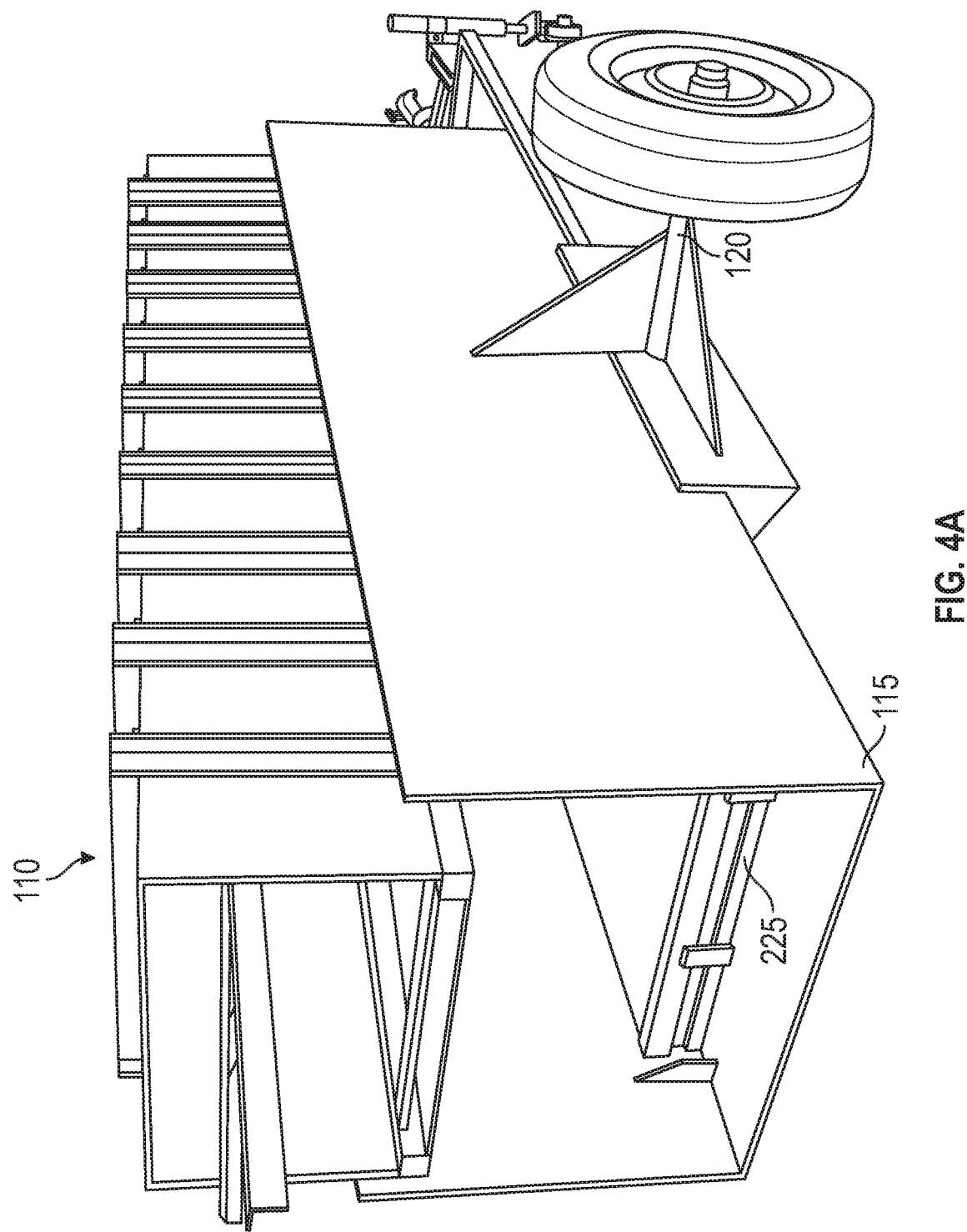
FIG. 4A depicts a partially assembled roaster, in accordance with the disclosed embodiments.
Figure 4B:
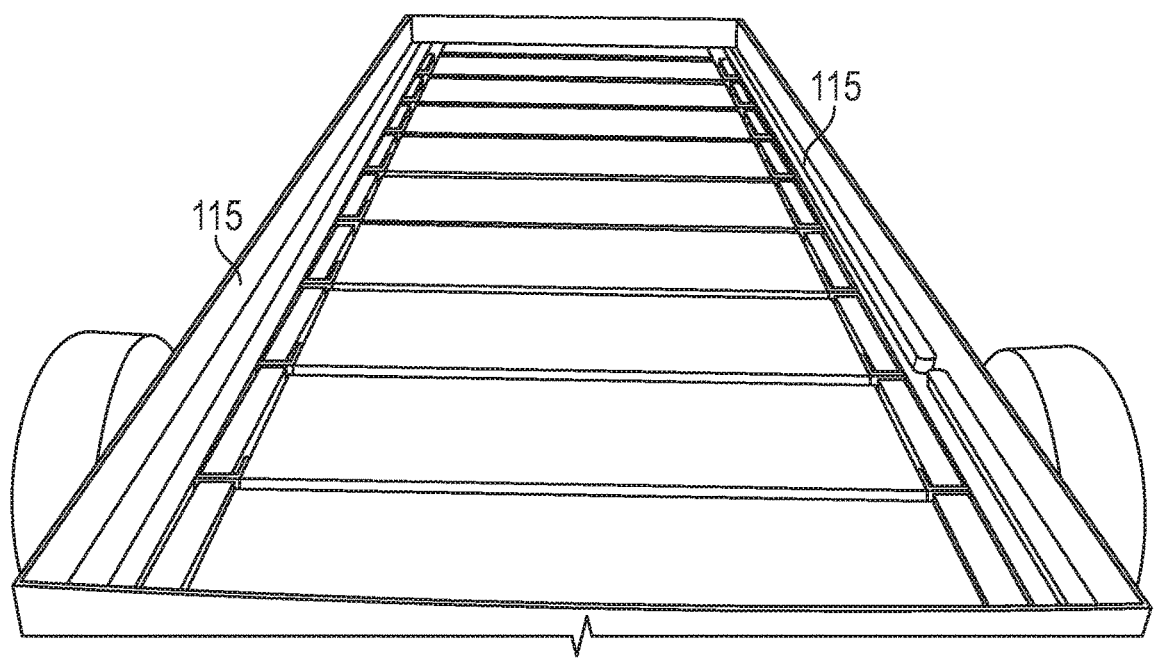
FIG. 4B depicts a partially assembled roaster, in accordance with the disclosed embodiments.
Figure 4C:
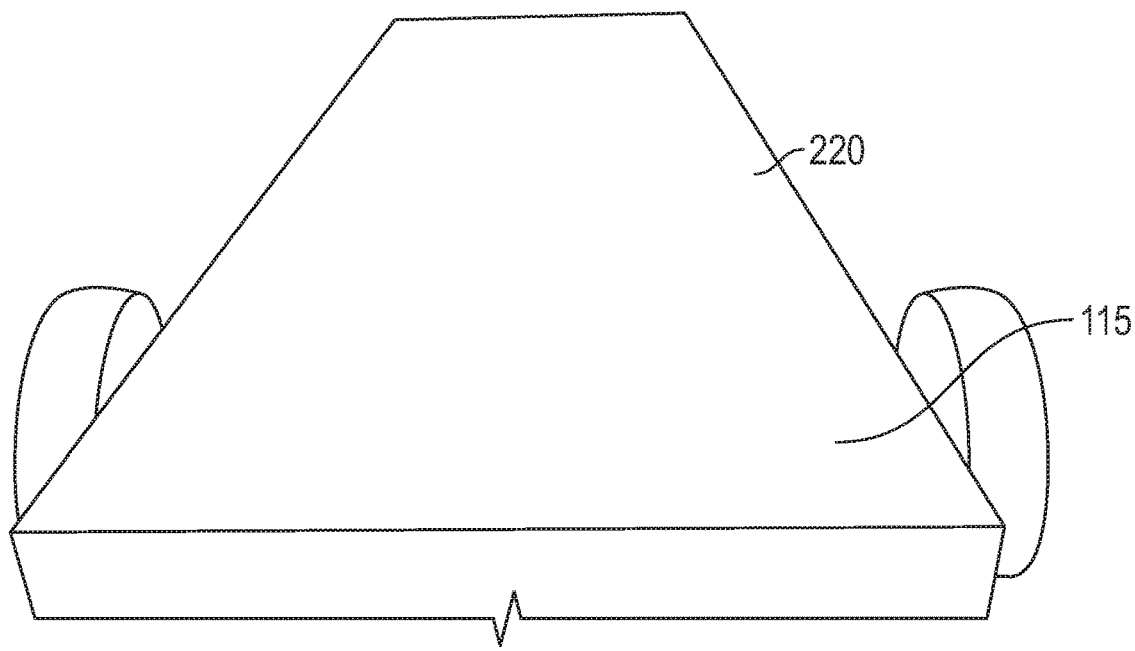
FIG. 4C depicts a partially assembled roaster, in accordance with the disclosed embodiments.

The exterior housing 115 can have insulation 225 applied therein as shown in FIGS. 4A-4C. Specifically the voids between the inner roasting chamber 110 and exterior housing 115 can be filled with mineral wool board, or other such insulation 225. Once the insulation 225 is installed the top sheet 220 to the outer housing can be welded in place to close the inner roasting chamber 110 inside the exterior housing 115.

The exterior housing 115 can further be connected to the wheel and axle assembly 120 and a hitch 135, that allows the roaster 100 to be connected to a vehicle and transported as necessary.

A special end cap fitting 505 is configured on the product exit end 336 of the inner roasting chamber 110. The end cap 505 provides room for thermal expansion and contraction necessary to prevent damage to the roaster 100. The end cap 505 is illustrated in FIG. 5A.

The end cap 505 can essentially comprises a first, three sided lip 510 connected (e.g. welded) to the rim of the exterior housing 115 and a second three sided lip 515. connected (e.g. welded) to the product exit end 336 of the inner roasting chamber 110. It should be appreciated that the end cap 505 can extended along all four sides of the product exit end 336.

Figure 5A:
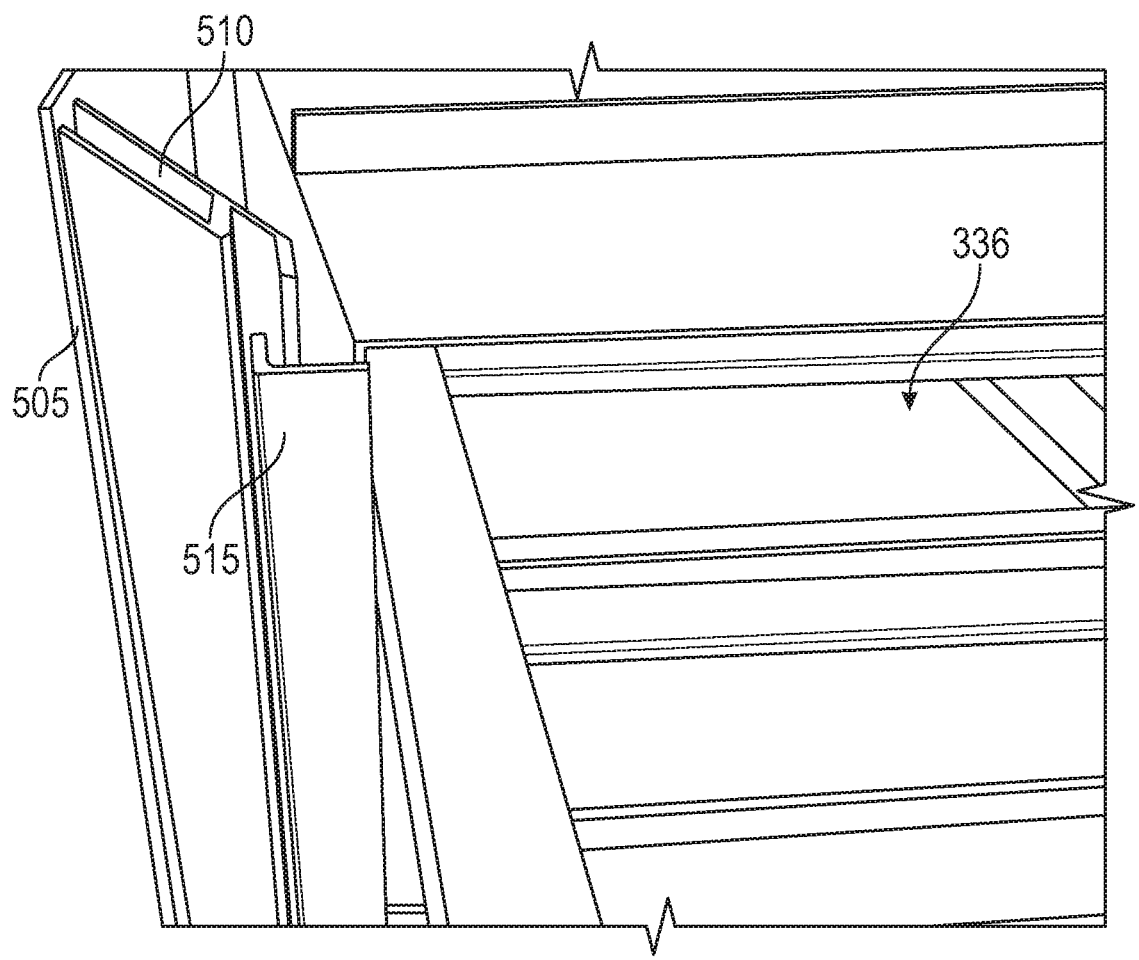
FIG. 5A depicts product exit end of a roaster, in accordance with the disclosed embodiments.

As illustrated in FIG. 5A, the open sides of the first three sided lip 510 and second three sided lip 515 face each other such that the respective lips overlap. As the inner roasting chamber 110 experiences thermal expansion and contraction the end cap 505 ensures the proper alignment of the inner roasting chamber 110 with respect to the exterior housing 115. The end cap 505 thus allows the inner roasting chamber 110 to expand in the exterior housing 115, without damaging the roaster 100.

Figure 5B:
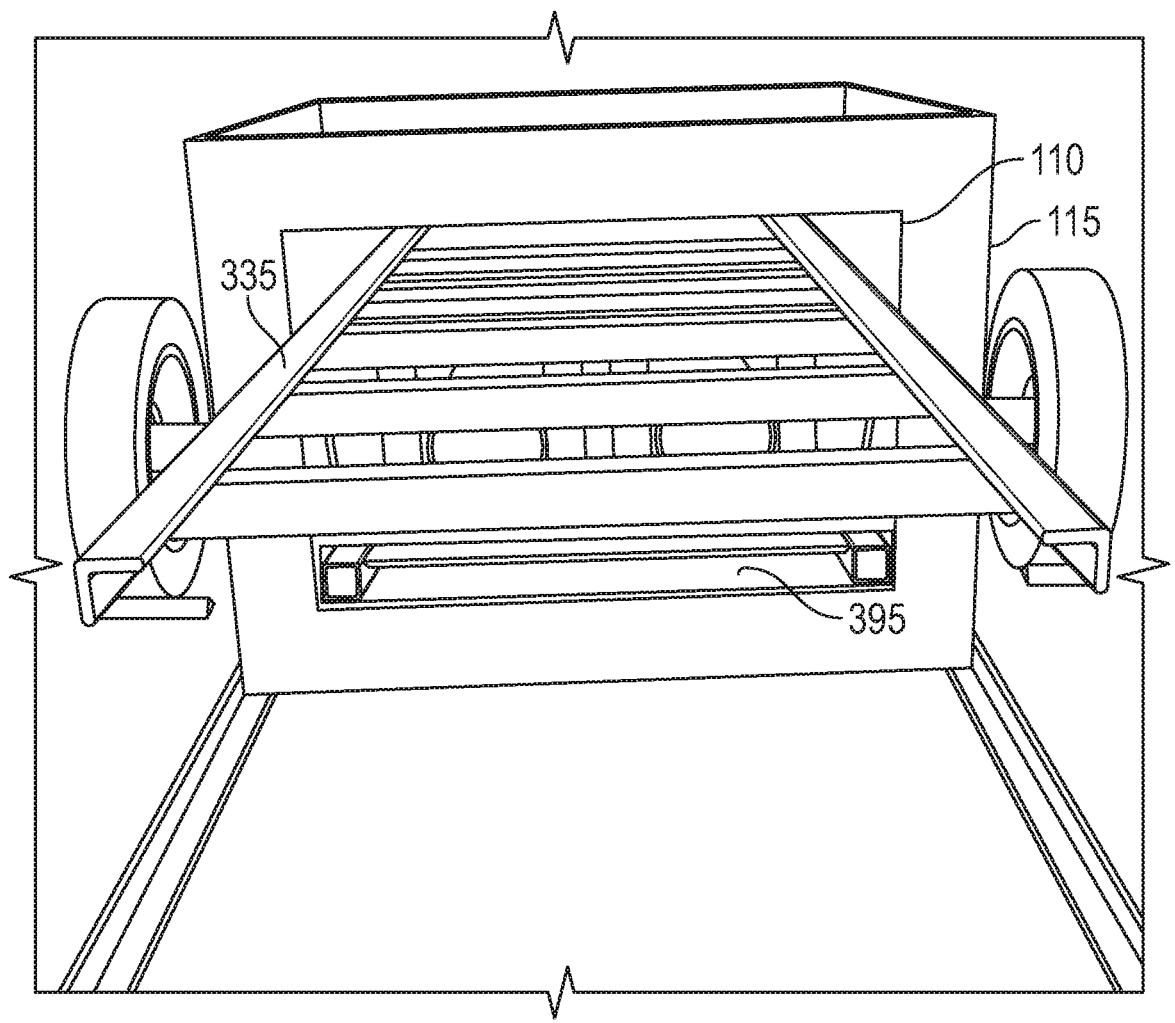
FIG. 5B depicts a burner end of a roaster, in accordance with the disclosed embodiments.

In certain embodiment, the burner end 335 of inner roasting chamber 110 can be welded flush to the exterior housing 115 as illustrated in FIG. 5B. As a result, the thermal expansion of the inner roasting chamber 110 is directed to the opposing product output side 336 of the inner roasting chamber 110.

It should be noted that FIG. 5B further illustrates the upper conveyor belt support structure upon which the conveyor belt travels. The upper conveyor belt support structure runs the length of the inner roasting chamber 110 and exits the inner roasting chamber 110.

The roaster 100 further includes a conveyor belt assembly 105 comprising a motor driven conveyor belt assembly 600. The constituent elements of the motor driven conveyor belt assembly 600 are illustrated in FIGS. 6A, 6B, 7A, and 7B. The conveyor belt assembly 600 drives the conveyor belt 605 through the inner roasting chamber 110.

Figure 6B:
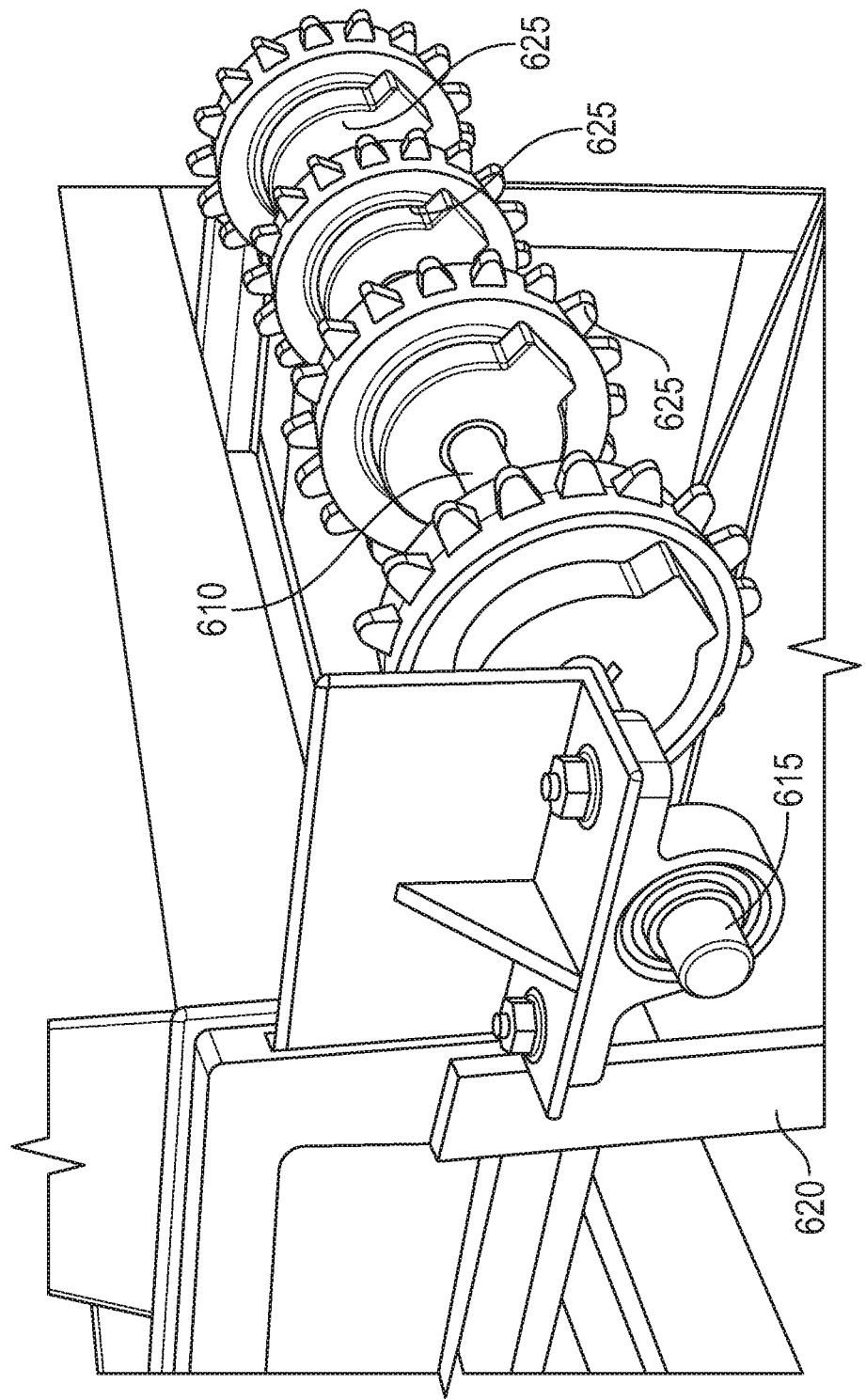
FIG. 6B depicts a motor driven conveyor belt assembly, in accordance with an embodiment.

FIGS. 6A and 6B illustrate the conveyor belt assembly 600 on burner end 335 of the roaster 100. The conveyor belt assembly 600 includes a drive shaft 610 connected to bearing and race assemblies 615 on each end of the drive shaft 610, that allow the drive shaft 610 to spin. The bearing and race assemblies 615 can be mounted to the support structure 620 of the roaster 100. A series of fixed cogs 625 are attached to the drive shaft 610, such that the fixed cogs 625 spin, as the drive shaft 610 turns. The teeth of the cogs 625 engage the conveyor belt 605, thereby pulling the conveyor belt 605 through the inner roasting chamber 110.

It should be understood that all of the parts in the conveyor belt assembly can be formed of stainless steel or other such FDA compliant material.

The drive shaft 610 extends through the bearing and race assembly 615 on one end and a drive ring 630 is affixed thereto. The drive ring 630 is configured to accept a drive chain 635 that is further connected to a motor 640. The motor 640 includes a motor ring 655 that is attached to the drive ring 630 with the drive chain 635. In operation, the motor 640 turns the motor ring 655, which is functionally attached to the drive ring 630 with the drive chain 635. As the drive ring 630 turns, the drive shaft 610 turns.

The motor 640 can comprise a fully adjustable electric motor. The motor 640 is adjustable so that it can be tuned to adjust the speed of the associated conveyor belt 605, to tune how long the product on the conveyor belt 605 is subject to roasting heat. The conveyor belt 605, which can comprise a linked chain mesh, or other such conveyor belt, is pulled at the desired speed by the cogs 625 on the drive shaft 610. The end of the roaster 100 can include a belt guide 660, that ensures the chain mesh associated with the conveyor belt 605 is properly aligned. The roaster 100 can further include a free wheel dowel 665 configured below the drive shaft 610, that facilitates proper movement of the conveyor belt 605.

The motor 640 is mounted to the roaster 100 with a motor mount 645. A heat shield 650 is configured on the roaster 100 where the motor 640 is mounted. The heat shield 650 prevents heat from the roaster 100 from fouling the motor 640 operation.

Figure 7A:
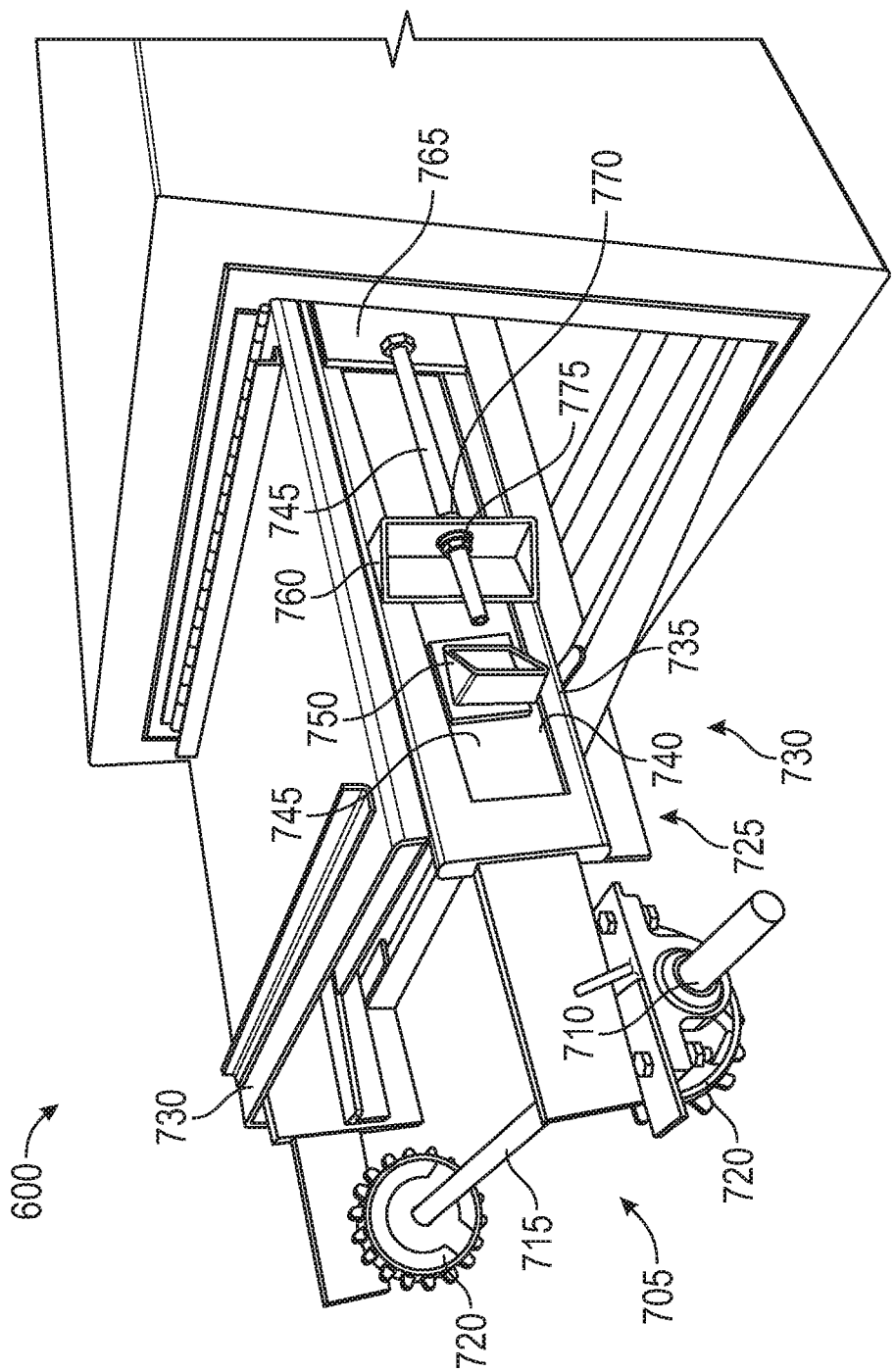
FIG. 7A depicts an opposing side of the conveyor belt assembly, in accordance with the disclosed embodiments.
Figure 7B:
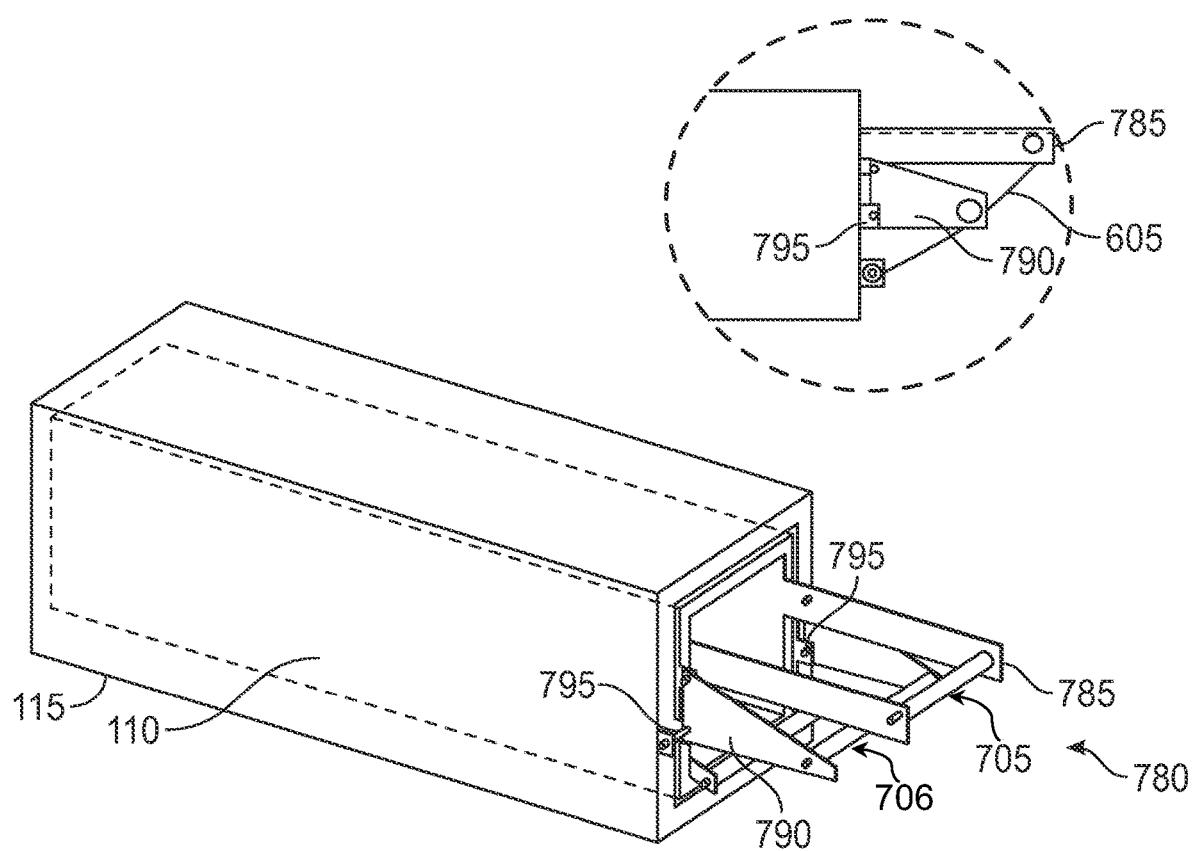
FIG. 7B depicts an automatically adjusting tensioning mechanism, in accordance with the disclosed embodiments.

The opposing side of the conveyor belt assembly is illustrated in FIGS. 7A and 7B. On this side, the conveyor belt assembly 600 comprises an upper roller 705. The upper roller 705 comprises a race and bearing assembly 710 on each end of a shaft 715 mounted to the roaster 100. A roller cog 720 is provided on each end of the shaft 715. The teeth on the roller cogs 720 engage with the conveyor belt 605.

As noted above, it should be understood that the various features of the conveyor belt assembly 600, including the roller cogs 720, shaft 715, race and bearing assemblies 710, and mesh conveyor belt 605 can be configured of stainless steel, or other such FDA compliant material.

The conveyor belt assembly 600 further includes a specially designed tensioning mechanism 725, that is configured to adjust tension in the conveyor belt 605 as the inner roasting chamber expands and contracts.

Manual adjustment of the tension in the mesh conveyor belt 605 can be made with the sliding adjustment 730. The manual sliding adjustment 730 allows the linear distance to the upper roller 705 to be adjusted. The sliding adjustment 730 includes an arm 735 that extends out from the inner roasting chamber 110. Arm 735 includes an internal void. In arm 735 an outward facing window 740 is provided. A sliding arm 745 can be positioned inside of arm 735. Sliding arm 745 is operably connected to the upper roller 705.

A slide mount 750 can be mounted to arm 735. A slide press 760 is mounted to sliding arm 745 through outward facing window 740. The slide mount 750 includes a hole through which a threaded bolt 755 can be inserted. The threaded bolt 755 is mounted on one end to a stop 765 on the arm 735 and on the other end to the slide press 760. Nut 770 and nut 775 can be used to adjust the length of sliding arm 745. It should be appreciated that the tensioning mechanism 725 can include two slide adjustments 730, one on each side of the roaster 100.

In another embodiment, the tensioning mechanism 725 can comprise an automatic tensioning mechanism 780. The automatic tensioning mechanism 780 can comprises an upper conveyor support 785 with upper roller 705, positioned above a lower conveyor support 790 which includes a lower roller. The lower roller 706 can comprise the same parts as the upper roller 705.

The lower conveyor support 790 is connected to the exterior housing 115 with a rotating pin 795 on each side. The top of the lower conveyor support 790 is fixedly attached to the inner roasting chamber 110. When the inner roasting chamber 110 experiences thermal expansion, the inner roasting chamber 110 expands outward, naturally forcing the lower conveyor support 790 to pivot at rotating pin 795. The lower position of the lower conveyor support 790 changes the path length of the conveyor belt 605, and thus, adjusts the tension in the conveyor belt 605. Similarly, as the inner roasting chamber cools and contracts, the lower conveyor support 790 pivots back, again adjusting the path length of the conveyor belt 605, to automatically adjust the tension in the conveyor belt 605.

Figure 8A:
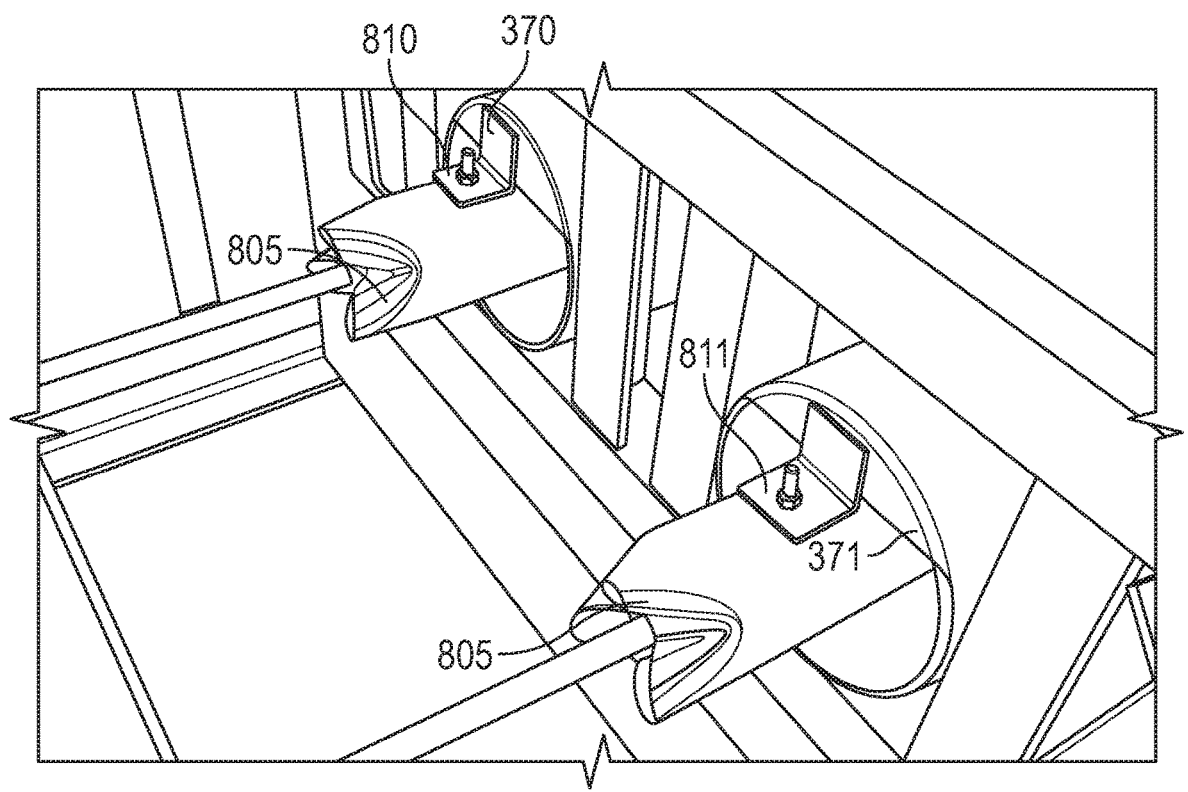
FIG. 8A depicts a burner in a burner tube, in accordance with the disclosed embodiments.

Each of the burner tubes (e.g. burner tube 355 and burner tube 356) can be fitted with a burner 805 shown in FIG. 8A. Each burner 805 can be mounted to a respective burner tube via a burner support tab (e.g. burner support tab 370 and burner support tab 371). For example, a tab mount 810 can be welded to burner support tab 370. A mounting bolt can then be fitted through burner 805 and tab mount 810 and secured with a nut. Similarly, a tab mount 811 can be welded to burner support tab 371. A mounting bolt can then be fitted through burner 805 and tab mount 811 and secured with a nut.

The burners 805 can comprise propane or natural gas burners, capable of providing up to 500,00 BTUs. In other embodiments, the burners 805 can comprise other burner types and can provide more or less heat according to the size of the roaster and its application.

Figure 8B:
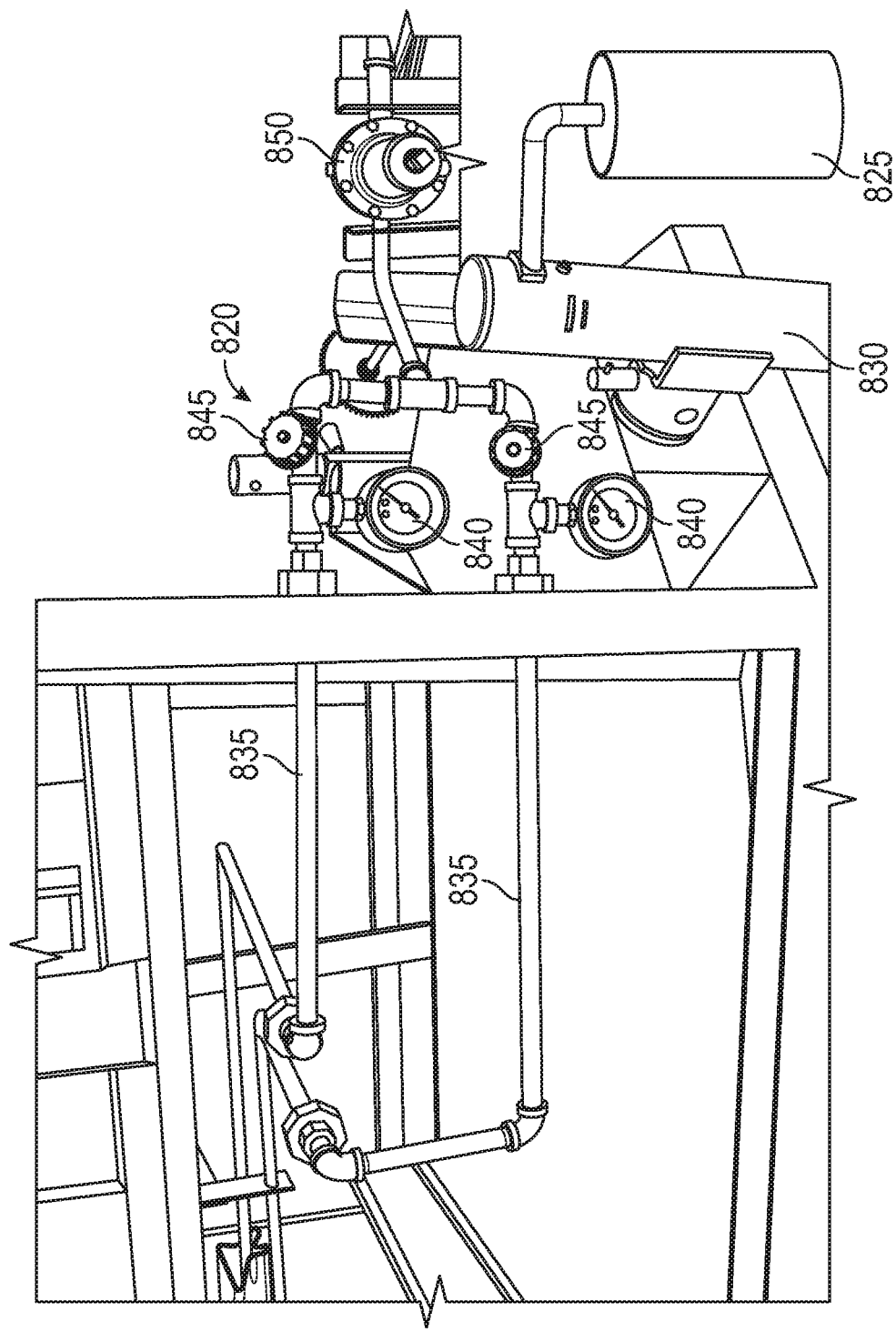
FIG. 8B depicts a gas distribution assembly, in accordance with the disclosed embodiments.

The burners 805 are connected to a gas distribution assembly 820 as illustrated in FIG. 8B. The gas distribution assembly 820 includes a gas (e.g. propane or natural gas) source such as a propane tank 825 connected to a master conduit 830. The master conduit 830 provides output conduit 835 to each of the respective burners 805. In the embodiments illustrated, two output conduit 835 are provided to two burners 805, but it should be understood that the master conduit 830 can be configured to accommodate more (or fewer) output conduit 835 as necessary.

Each of the output conduit 835 can include a pressure gauge 840 and valve 845 to regulate gas flow to the associated burner 805. Each of the output conduits 835 and the master conduit 830 can further include a safety stop device 850 to stop the flow of fuel in the event of an extinguished flame. This prevents the unintended evacuation of gas out of the burner 805, if the flame is accidentally extinguished, or during an emergency situation.

Figure 9:
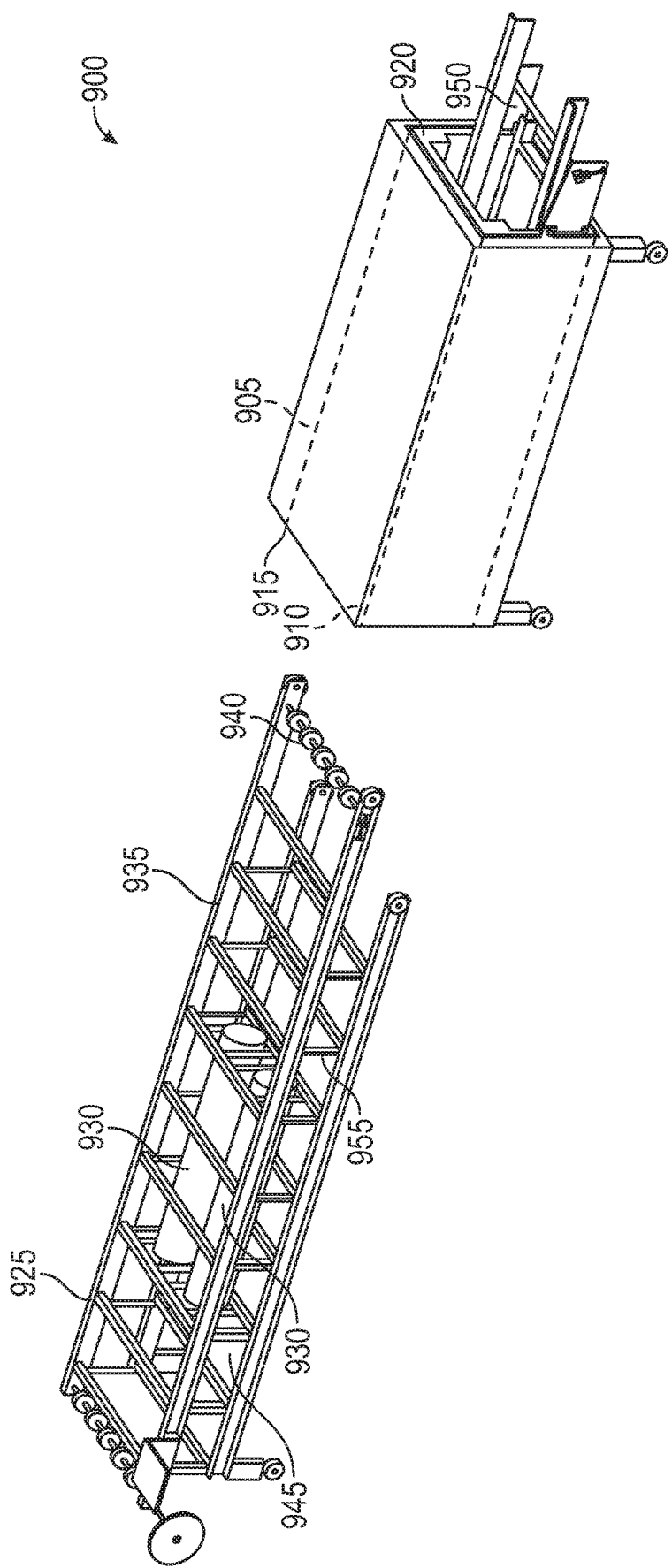
FIG. 9 depicts another embodiment of a roaster, in accordance with the disclosed embodiments.
Figure 10:
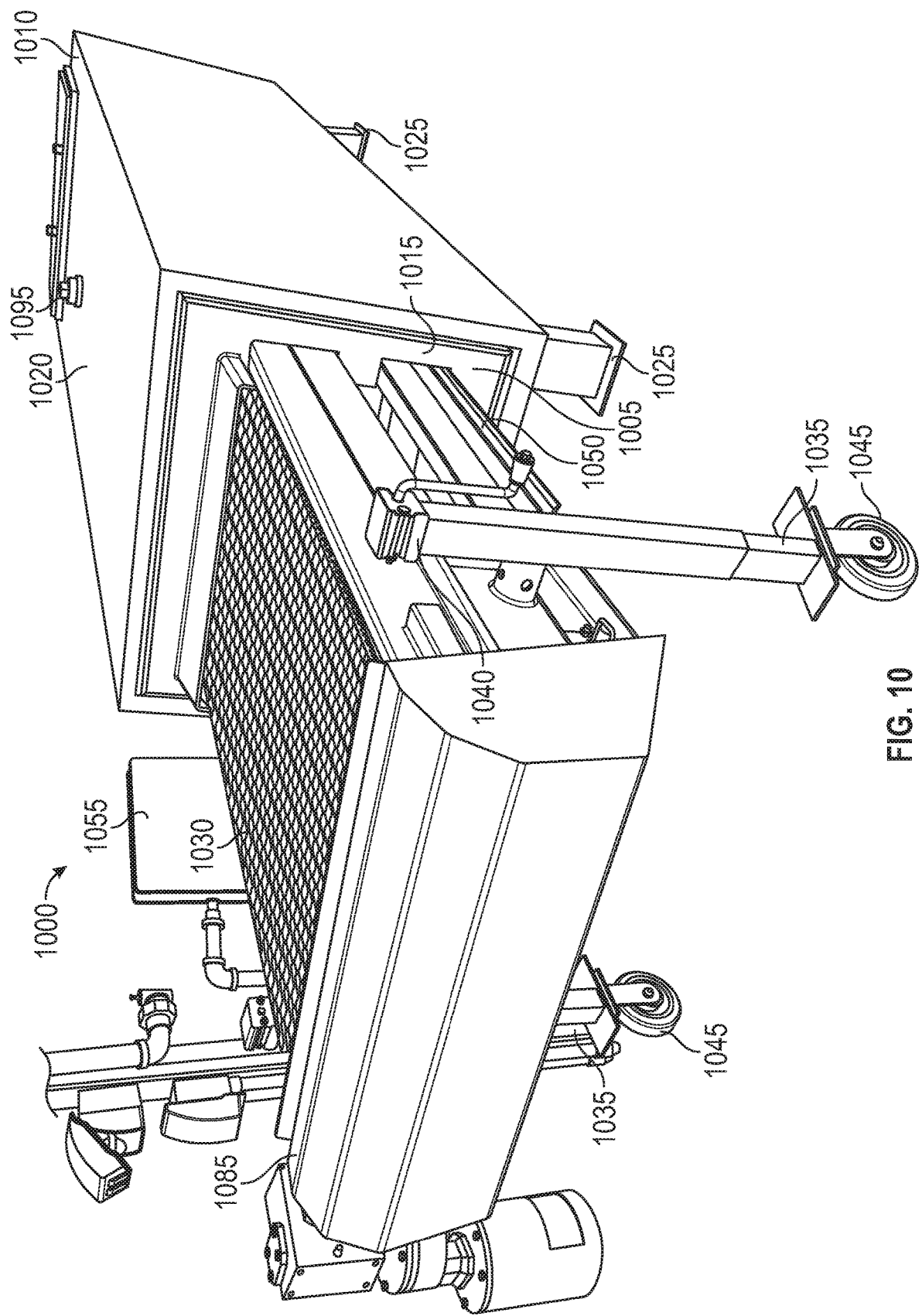
FIG. 10 depicts another embodiment of a roaster, in accordance with the disclosed embodiments.

FIG. 9 illustrates another embodiment of a roaster 100. As noted above, a major challenge in roasters is to reduce the number of voids, crevices, and cracks in the welded assembly that require cleaning. Regulatory agencies increasingly find such welds unsanitary, and new roasters are being held to more stringent sanitation practices.

Thus, the embodiment illustrated in FIG. 9 introduces a roaster 900 comprising an integrated inner roasting chamber 905 and outer tube 910. The inner surfaces of the integrated inner roasting chamber 905 can be smooth, can include few or no welds, and can therefore be sanitized easily. Specifically, the integrated inner roasting chamber 905 can be fabricated with no visible seams at wall intersections, corners, joints, etc. The burner end 915 of the integrated inner roasting chamber 905 and outer tube 910 can be welded together, preferably external to the integrated inner roasting chamber 905.

On the output end 920 of the roaster 900, the integrated inner roasting chamber 905 is independent of the outer tube 910. Thus, the integrated inner roasting chamber 905 is able to freely move toward the output side 920 of the roaster 900, as the roaster 900 experiences thermal expansion. Of critical importance, the integrated inner roasting chamber 905 is smooth and has no cracks or voids and limited welds therein. Any welds can be finished smooth so that the entire integrated inner roasting chamber 905 can be sanitized before and after use.

The embodiment illustrated in FIG. 9 further comprises a burner, frame and conveyor assembly 925 that can be removed from the integrated inner roasting chamber 905. It should be appreciated that some or all of the components illustrated in other embodiments (e.g. the motor, sprockets, frame design, burner assembly, etc.) can be used in this and other embodiments, and can be interchanged as necessary.

In the embodiment illustrated in FIG. 9, the burner tubes 930 can be configured on a frame 935. The ends of the frame 935 can be configured with a set of wheels 940, which can comprise wheels or casters, that allow the frame 935 to be rolled into place in the integrated inner roasting chamber 905. A stop can be included on the inner roasting chamber, on the burner end, to keep the frame 935 resting on the oven 900 after it is pulled out (e.g. during cleaning). A disconnecting mechanism can be included on the burner side 915 of the integrated inner roasting chamber 905 with a mating mechanism 945 on the frame 935 that secures the frame 935 in place during use, and ensures that all expansion is in the output direction.

The frame 935 can thus be removed from the integrated inner roasting chamber 905. The conveyor 950 can be comprised of a steel frame, the burner assembly, stainless steel conveyor belt, and the drive train as detailed in the embodiments described in the other embodiment. The frame 935 can be fully retracted from the oven 900 thereby allowing for a seamless construction of both individual sections. The ability to separate the conveyor 950 from the oven 900 allows the entire roaster 900 to be completely sanitized. The fact that the integrated inner roasting chamber 905 is free to travel independently of the outer tube 910 also allows for venting.

The frame 935 also provides the ability to adjust the height of the belt associated with the conveyor 950 to the optimal height in the oven 900. The separate frame 935 construction can include an expandable set of support beams 955 to change the conveyor 950 height so that it can be adjusted to desired height for the roasting technique required for different types of product.

This embodiment provides the ability to completely remove the frame 935 which provides access to sanitize all aspects of the roaster 900. In the embodiments, the expansion of the integrated inner roasting chamber 905 can be used to automatically tension the conveyor belt (which undergoes expansion due to the high heat output from the heat source). When the integrated inner roasting chamber 905 expands, a belt tensioner, such as tensioning mechanism 725, can mechanically apply additional tension to the conveyor belt. The bearings in the tensioning mechanism can be selected to meet FDA requirements. The belt system can thus be sanitized before and after operating.

In another embodiment, a roaster 1000 is illustrated. The roaster 1000 can incorporate any of the features of the embodiments illustrated in other embodiments. The roaster 1000 includes an input side 1005 and an output side 1010. The roaster 1000 has an outer body 1020 and an inner roasting chamber 1015. As in other embodiments, the inner roasting chamber 1015 is free to thermally expand and contract within outer body 1020.

In the embodiment, the roaster body rests on legs 1025. The conveyor assembly 1030 is connected on a distal end to legs 1035. The height of legs 1035 can be adjusted with crank 1040. The height can be adjusted to level the conveyor assembly 1030 and or to adjust the height of the conveyor assembly 1030 in the inner roasting chamber 1015. Each of legs 1035 has a wheel or caster 1045 that allows the conveyor assembly 1030 to be extracted from, and inserted into, the inner roasting chamber 1015. The legs 1035 can be connected to the conveyor assembly frame 1050. A removable shroud 1085 is provided on the end of the conveyor assembly 1030. In addition, a temperature port 1095 is provided in the roaster 1000 to allow the temperature of the inner roasting chamber 1015 to be checked with a thermometer.

Gas and electrical connections for the burner can be mounted to the conveyor assembly frame 1050. The gas and electrical connections can be protected from the roaster 1000, with a heat shield 1055. Another heat shield 1080 can be provided along the sides of the burner tubes 1060 within the conveyor assembly 1030.

Figure 11:
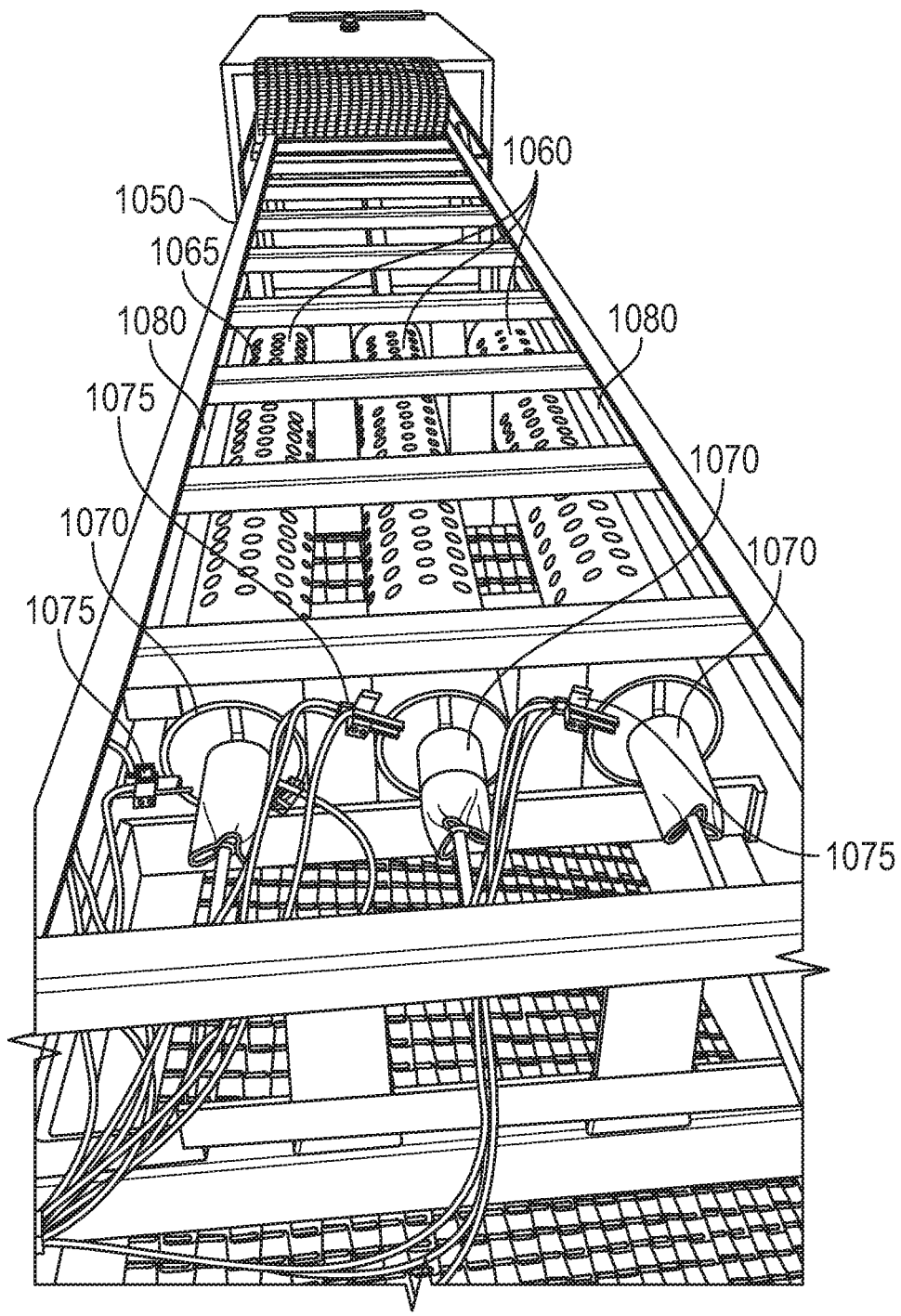
FIG. 11 depicts a burner assembly, in accordance with the disclosed embodiments.

A series of burner tubes 1060 can be housed in the conveyor assembly frame 1050, as illustrated in FIG. 11. Each of the burner tubes 1060 include a plurality of diffusion holes 1065. Burners 1070 can be mounted in the burner tubes 1060. Each of the burners 1070 can be connected to the gas distribution system, as further detailed herein. The end of each burner tube 1060 is further fitted with a pilot ignition 1075. The electrical connection to the pilot ignition is connected to a power supply such as a battery or outlet. The gas distribution system can be used to provide gas to the burners 1070. To start the burner 1070 the pilot ignition 1075 provides a spark to ignite the gas.

Figure 12:
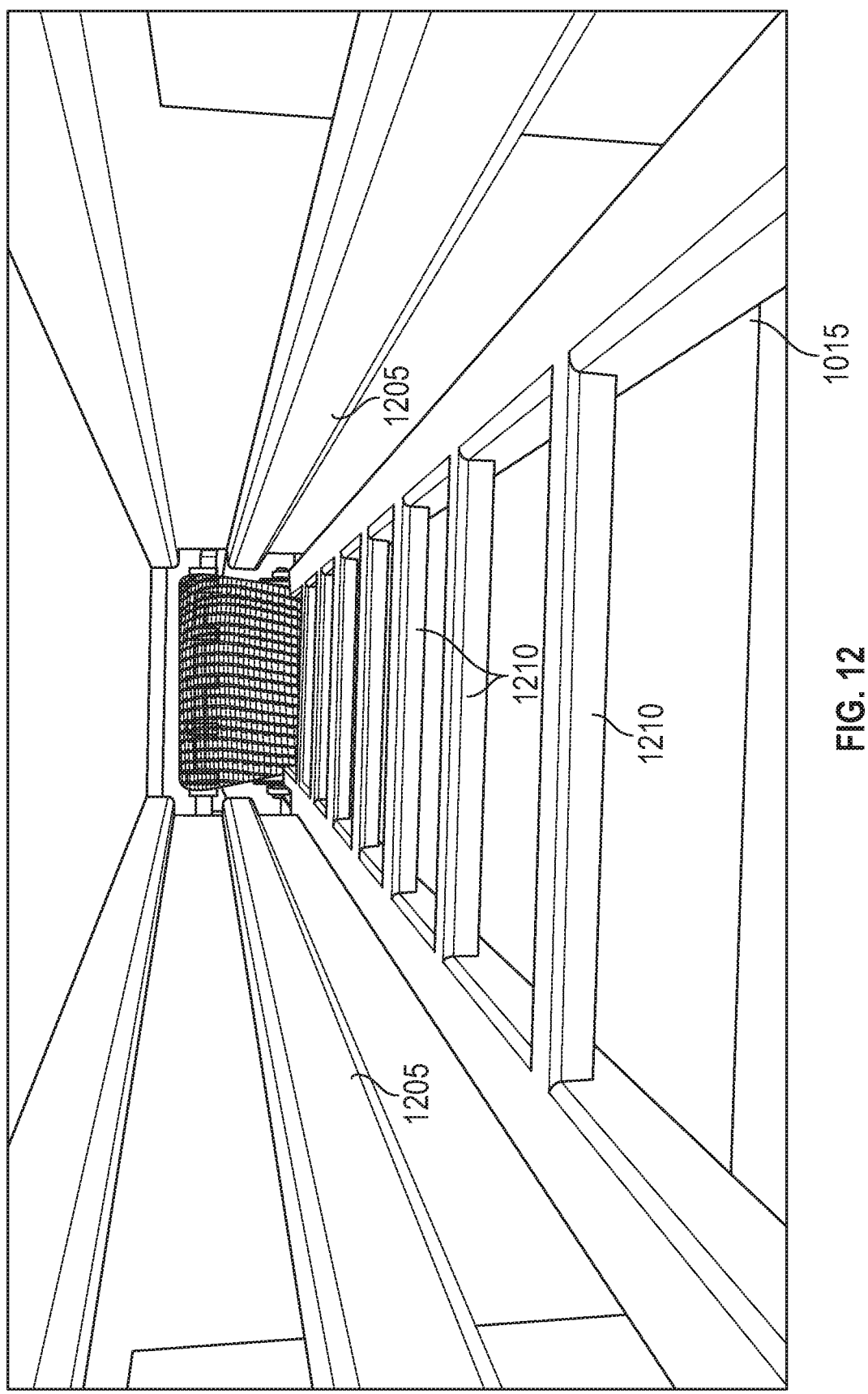
FIG. 12 depicts an elevation view of an inner roasting chamber in accordance with the disclosed embodiments.

An elevation view of the interior of the inner roasting chamber 1015 is shown in FIG. 12. As illustrated in FIG. 12, all of the inside corners, edges, joints, and interfaces are smooth and/or are formed with a radius to prevent sharp joints, or junctions and allow for cleaning. The walls of the inner roasting chamber 1015, have conveyor body supports 1205. Rollers formed on the ends of the conveyor support assembly can roll along the conveyor body supports 1205. The inner roasting chamber 1015 includes lower belting supports 1210.

Figure 13A:
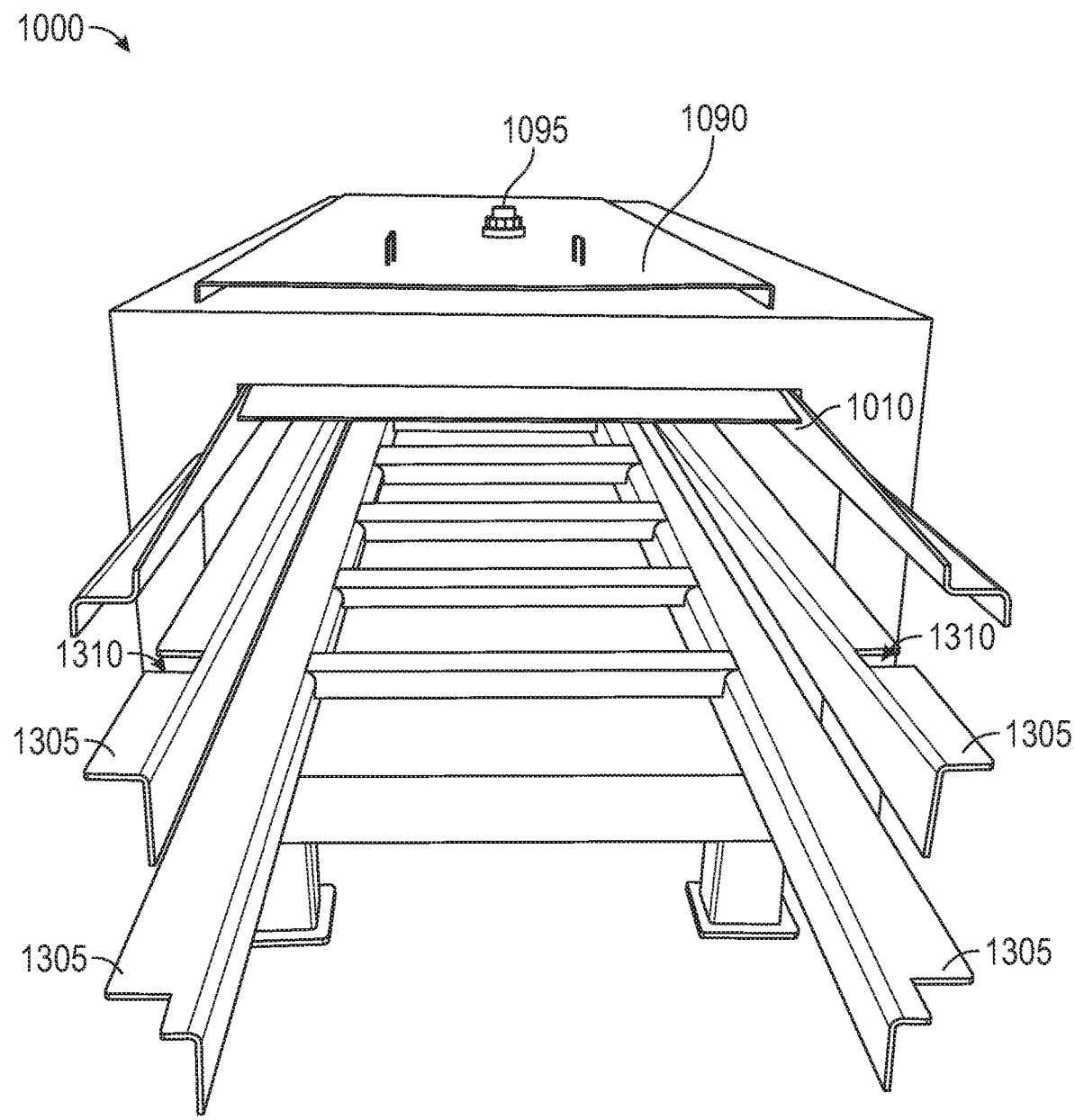
FIG. 13A depicts an output end of a roaster, in accordance with the disclosed embodiments.

FIG. 13A illustrates the output end 1010 of roaster 1000 without the conveyor assembly 1030. The output end 1010 includes conveyor support arms 1305. The conveyor support output arms can be configured with output roller end stops 1310 that stop the conveyor support assembly 1030 from being pushed out the output end 1010 of the roaster 1000. All expansion of the inner roasting chamber 1015 can take place on the input side 1015 of the roaster 1000.

Figure 13B:
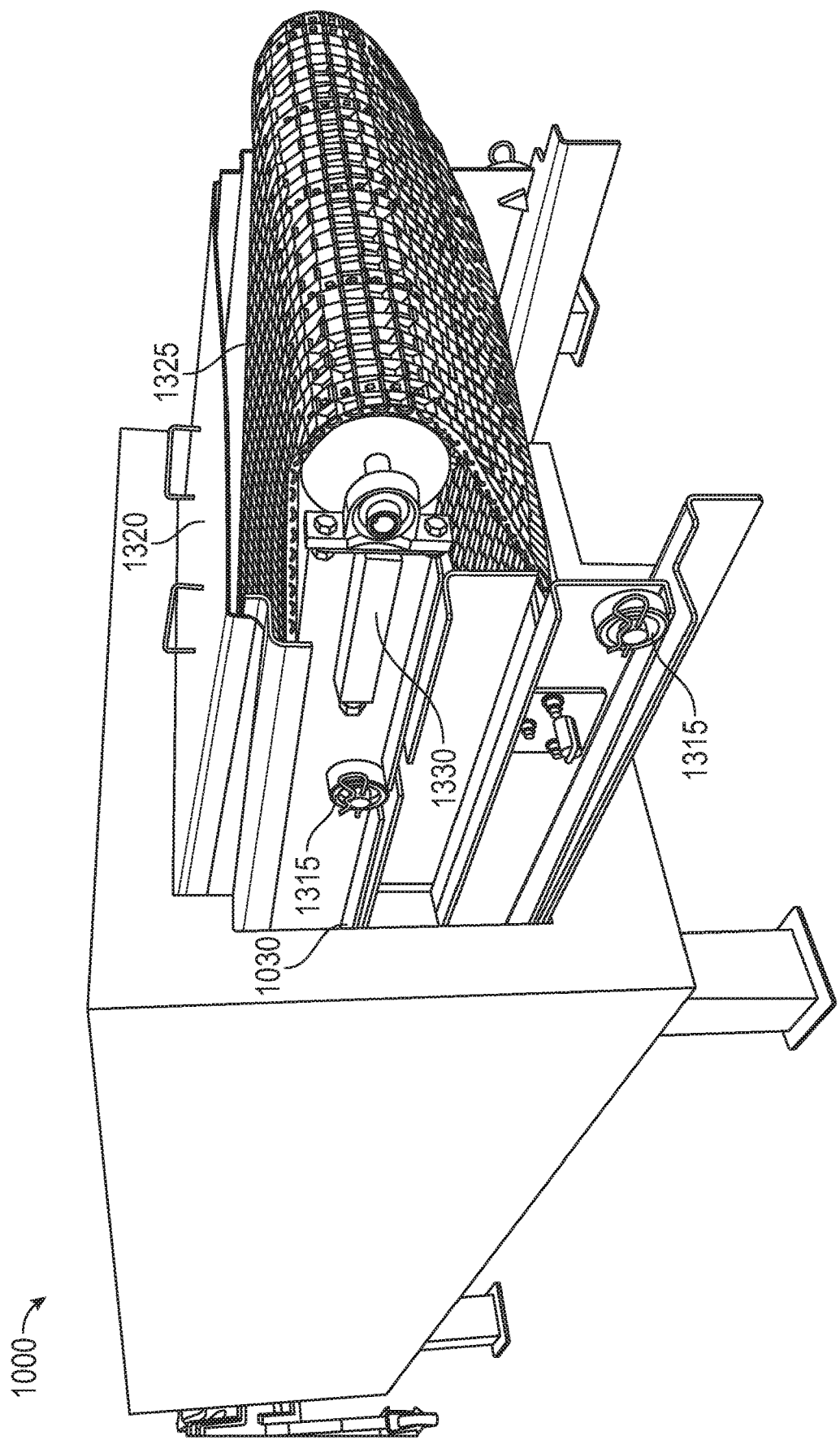
FIG. 13B depicts an output end of a roaster with a conveyor belt assembly, in accordance with the disclosed embodiments.

FIG. 13B illustrates the output end 1010 of roaster 1000 with the conveyor assembly 1030. The conveyor assembly 1030 includes removable wheels 1315. The wheels are removable so that they can be properly sanitized. The wheels can also be formed of a material capable of withstanding the extreme heat experienced by the roaster 1000. The end of the output end 1010 can include a removable cover 1320 that allows the roaster 1000 to cool more quickly after use. The conveyor assembly 1030 can further comprise a belt tensioning member 1330, that can act to adjust the path length of the belt 1325 as the roaster expands and contracts.

Figure 14A:
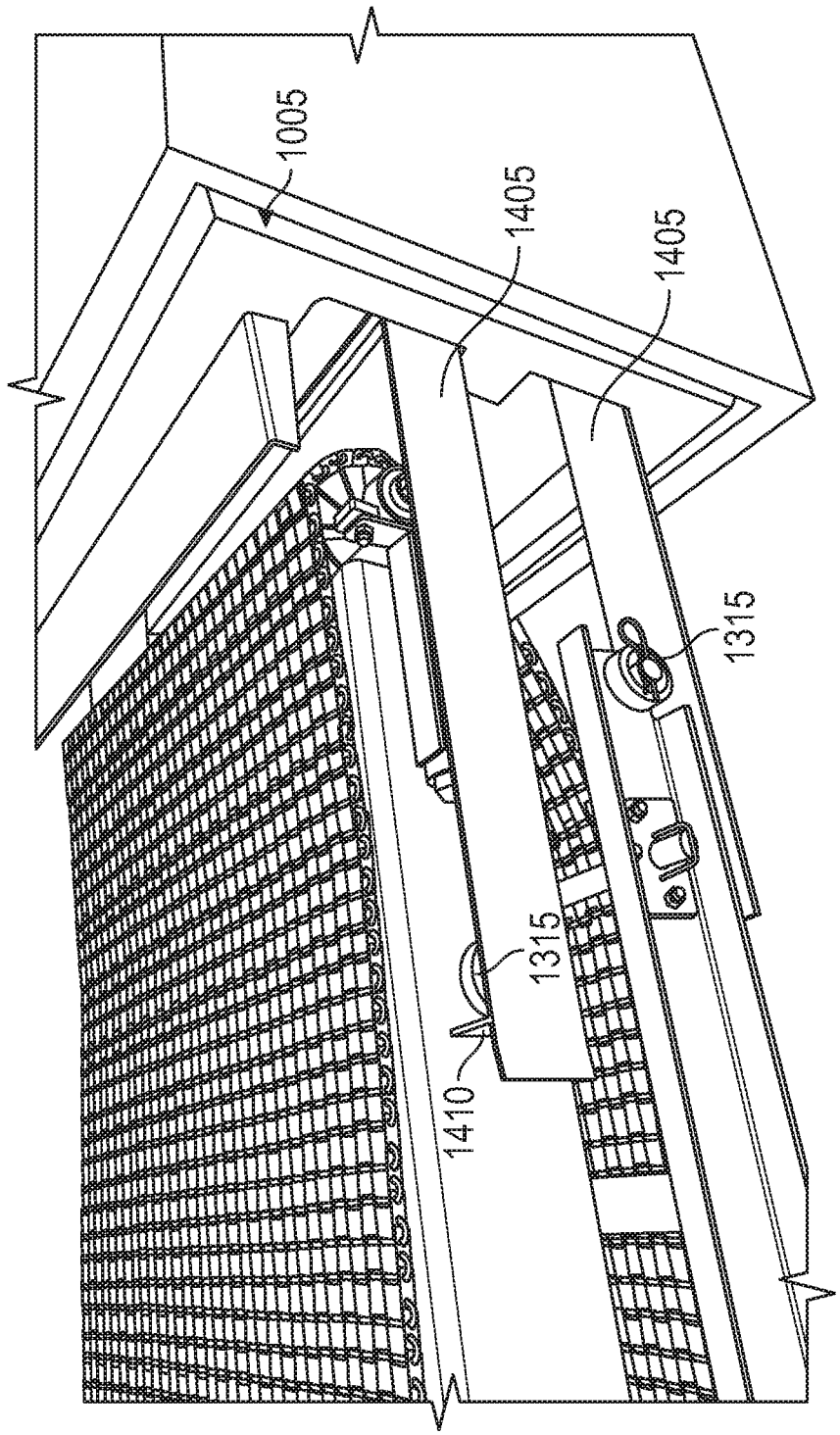
FIG. 14A depicts an input end of a roaster, in accordance with the disclosed embodiments.

FIG. 14A illustrates input end 1005 of roaster 1000. The input end 1005 includes support arms 1405. The support arms have stops 1410, to prevent the conveyor assembly from being pulled clear of the inner roasting chamber accidentally.

Figure 14B:
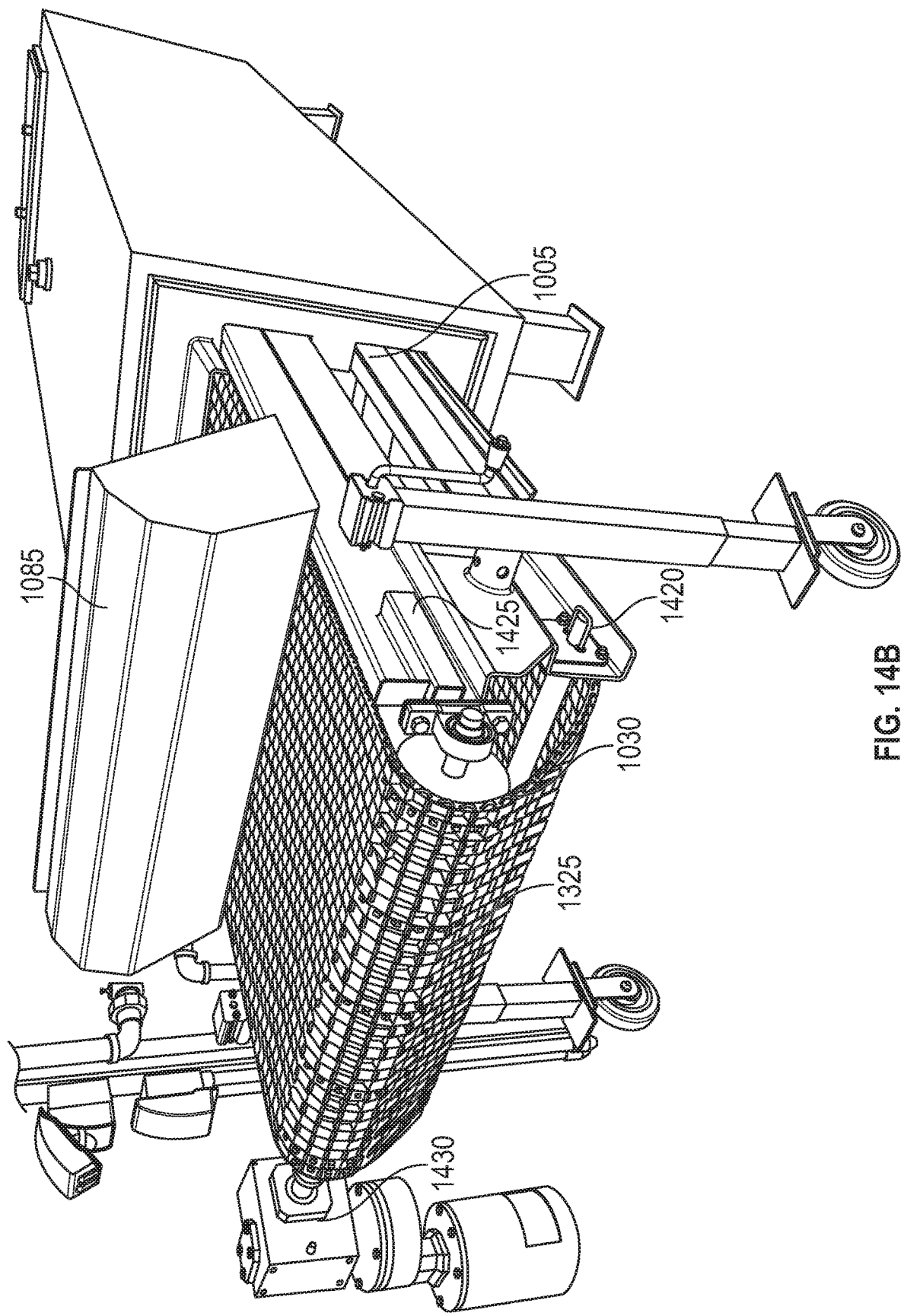
FIG. 14B depicts an input end of a roaster with a conveyor belt assembly, in the inner roasting chamber in accordance with the disclosed embodiments.

FIG. 14B illustrates the conveyor assembly 1030 from the input end 1005 of the roaster 1000. The conveyor assembly 1030 can include the conveyor belt assembly 600 including bushings 1420 that can be made of brass. A tensioning member 1425 can be provided on this end of the conveyor assembly 1030. In addition, a motor 1430 can be connected to the conveyor belt assembly 600 or conveyor belt assembly 105, to drive the belt 1325.

A completed roaster 100 is illustrated in FIG. 1. As FIG. 1 illustrates, the roaster 100 can include a cover for the gear assembly during storage. In addition, the exterior of the roaster can be finished to protect the system from external factors such as weather, etc. Insulation 130 can be provided along the exterior panels of the roaster 100 to prevent heat loss, and improve the safety of the roaster when in use, by reducing the possibility that the hot surfaces of the roaster are contacted by a person.

In an exemplary embodiment, the roaster can be used to roast chile (or other desired products). In such embodiments, the chile is fed into the hopper of the roaster, as the conveyor belt moves, the chile is roasted inside inner roasting chamber (preferably at the preselected optimal height in the oven). At the output side of the inner roasting chamber, the roasted chile falls off the conveyor belt into a collection device.

Figure 15:
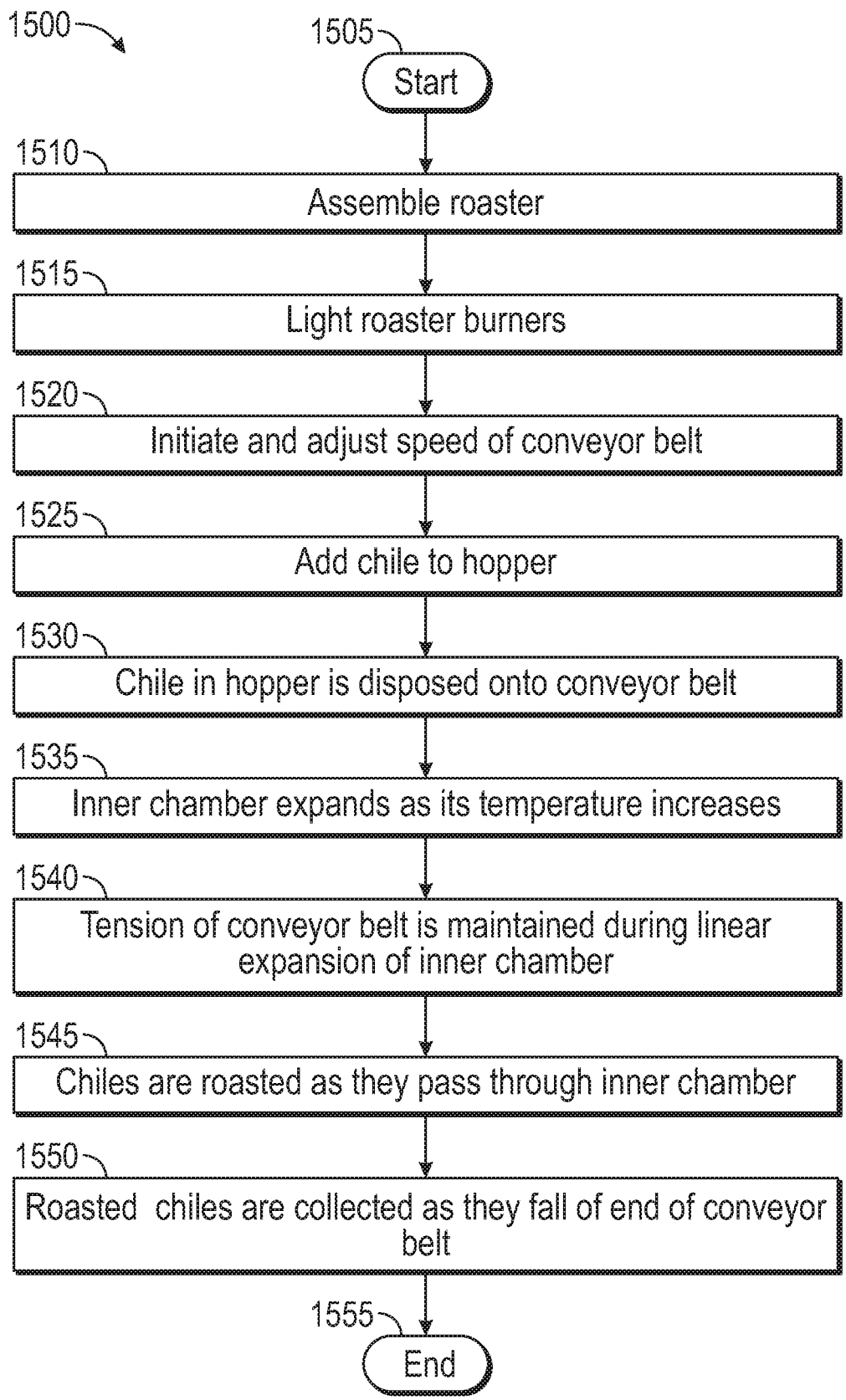
FIG. 15 depicts a method for roasting product, in accordance with the disclosed embodiments.

FIG. 15 illustrates a method 1500 for roasting chile according to the disclosed embodiments. The method 1500 begins at step 1505.

At step 1510, a roaster as disclosed herein can first be assembled. Of critical importance, is that the inner roasting chamber be configured inside the exterior housing, as disclosed herein, so that thermal expansion of the inner roasting chamber does not cause damage to the roaster. The roaster can further be substantially formed of stainless steel or other FDA approved material that facilitates cleaning of the roaster. The roaster can further include a removable bottom tray, or a removable frame, to improve the ease with which the roaster can be cleaned.

The roaster burners can then be lit by opening the valves for each burner and regulating the gas flow for the desired output heat as illustrated at step 1515. It should be understood that a pilot can be used to light the gas after the flow has started. The conveyor system can also be engaged so that the conveyor belt moves through the inner roasting chamber at the optimal roasting height as illustrated at step 1520. The speed of the conveyor belt can also be adjusted to ensure the proper roasting time for the product. The roaster is now ready for the introduction of a product (such as chile) in the hopper. Thus, at 1525, the product is fed into the hopper. The product can be dispersed onto the conveyor belt from the hopper, as shown at 1530, at a desired rate.

Note that the inner chamber will experience thermal expansion as its temperature increases during use, as shown by step 1535. This thermal expansion can be addressed, as disclosed herein, with the unique design which allows the inner chamber to expand out of the outer housing on one or both sides. Likewise, the expansion of the inner chamber can result in automatic adjustment of the tension in the conveyor belt assembly, as illustrated at step 1540, thus improving the duty cycle of the roaster.

Step 1545 explains that as the chiles pass through the inner chamber, the temperature of the burners and the speed of the conveyor belt can be adjusted to achieve the desired level of roasting. Finally, at 1550, at the end of the conveyor belt, a collection device can collect the roasted chiles as they fall from the conveyor belt.

When the roasting is complete, the roaster can be allowed to cool. As the roaster cools, the inner roasting chamber will contract to its original size inside the outer housing, without damage to the roaster. At this point, the roaster is ready for cleaning and the method is complete as shown at 1555.

Based on the foregoing, it can be appreciated that a number of embodiments, preferred and alternative, are disclosed herein. In an embodiment, a roaster system comprises an inner roasting chamber; an exterior housing, housing the inner roasting chamber such that the inner roasting chamber can expand and contract, a conveyor assembly, and a gas distribution assembly connected to at least one burner.

In an embodiment, the roaster system further comprises at least one burner tube connected to the at least one burner with a burner support tab. In an embodiment, the burner tube further comprises: a plurality of apertures, and a burner tube end cap formed on the burner tube.

In an embodiment, the roaster system further comprises at least one heat deflector baffle formed in the inner roasting chamber.

In an embodiment, the conveyor assembly further comprises: a conveyor belt, a motor configured to drive the conveyor belt, and a tensioning mechanism to adjust tension in the conveyor belt. In an embodiment the tensioning mechanism further comprises an automatic tensioning mechanism.

In an embodiment, the roaster system is formed of stainless steel.

In an embodiment, the roaster system further comprises a fixed engagement between the inner roasting chamber and the exterior housing on a burner end of the roaster system, and an end cap fitting on a product exit end of the roaster system.

In an embodiment, the roaster system further comprises insulation formed between the inner roasting chamber and the exterior housing.

In an embodiment, the gas distribution system further comprises a gas source, a master conduit connected to the gas source, and an output conduit connecting the master conduit to the burner.

In another embodiment, a roasting apparatus comprises an inner roasting chamber, an exterior housing, housing the inner roasting chamber, a fixed engagement between the inner roasting chamber and the exterior housing on a burner end of the roaster system, an end cap fitting on a product exit end of the roaster system such that the inner roasting chamber can expand and contract within the exterior housing, a conveyor assembly comprising a conveyor belt, a motor configured to drive the conveyor belt, and a tensioning mechanism to adjust tension in the conveyor belt, and a gas distribution assembly connected to at least one burner.

In an embodiment, the roasting apparatus further comprises at least one burner tube connected to the burner, the burner tube further comprising a plurality of apertures, and a burner tube end cap formed on the burner tube.

In an embodiment, the tensioning mechanism further comprises: an automatic tensioning mechanism.

In an embodiment, the gas distribution system further comprises a gas source, a master conduit connected to the gas source, and an output conduit connecting the master conduit to the burner.

In another embodiment, a roaster system comprises an inner roasting chamber, an exterior housing, housing the inner roasting chamber such that the inner roasting chamber can expand and contract, a burner, frame, and conveyor assembly formed in the inner roasting chamber, and a gas distribution assembly connected to at least one burner.

In an embodiment the roaster system the burner, frame, and conveyor assembly further comprises a frame for holding at least one burner tube, and a plurality of wheels attached to the frame wherein the frame can be removed from the inner roasting chamber.

In an embodiment, the roaster system further comprises at least one stop formed on the inner roasting chamber. In an embodiment, the roaster system further comprise a removable cover. In an embodiment, the roaster system further comprises a temperature port formed in the roaster system.

In an embodiment, the roaster system the corners and joints in the inner roasting chamber are formed with a radius and are smooth.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A roaster system comprising:
an inner roasting chamber;
an exterior housing, welded to a burner end of said inner roasting chamber such that an opposing product output side of said inner roasting chamber can expand and contract;
a conveyor assembly;
a gas distribution assembly connected to at least one burner;
at least one burner tube connected to said at least one burner with a burner support tab and a tab mount welded to said burner support tab, wherein said at least one burner tube further comprises a plurality of apertures, and a burner tube end cap formed on said at least one burner tube; and
an axle mounted to the exterior housing and a pair of wheels attached to said axle; and
burner supports configured to support the at least one burner tube, the burner supports comprising:
a first guide rail and a second guide rail;
a plurality of cross braces connected to vertical side walls of the inner roasting chamber and the first guide rail and second guide rail; and
a plurality of support posts extending between the plurality of cross braces;
wherein the burner supports form a conveyor slot through which the conveyor belt can travel.

2. The roaster system of claim 1 further comprising:
a mounting bolt fitted through the burner support tab and the at least one burner.

3. The roaster system of claim 1 further comprising:
at least one heat deflector baffle formed in said inner roasting chamber.

4. The roaster system of claim 1 wherein the conveyor assembly further comprises:
a conveyor belt;
a motor configured to drive said conveyor belt; and
a tensioning mechanism to adjust tension in said conveyor belt when the opposing product output side of said inner roasting chamber expands and contracts.

5. The roaster system of claim 4 wherein the tensioning mechanism further comprises:
an automatic tensioning mechanism.

6. The roaster system of claim 1 wherein the roaster system is formed of stainless steel.

7. The roaster system of claim 1 further comprising:
insulation formed between said inner roasting chamber and said exterior housing, said insulation comprising mineral wool board.

8. The roaster system of claim 1 wherein the gas distribution assembly further comprises:
a gas source;
a master conduit connected to said gas source; and
an output conduit connecting said master conduit to said at least one burner.

9. A roasting apparatus comprising:
an inner roasting chamber;
an exterior housing, welded to a burner end of said inner roasting chamber such that an opposing product output side of said inner roasting chamber can expand and contract;
an end cap fitting on a product exit end of said roaster system such that said inner roasting chamber can expand and contract within said exterior housing;
a conveyor assembly comprising a conveyor belt, a motor configured to drive said conveyor belt, and a tensioning mechanism to adjust tension in said conveyor belt;
a gas distribution assembly connected to at least one burner;
at least one burner tube connected to said at least one burner with a burner support tab and a tab mount welded to said burner support tab, wherein said at least one burner tube further comprises a plurality of apertures, and a burner tube end cap formed on said at least one burner tube; and
burner supports configured to support the at least one burner tube, the burner supports comprising:
a first guide rail and a second guide rail;
a plurality of cross braces connected to vertical side walls of the inner roasting chamber and the first guide rail and second guide rail; and
a plurality of support posts extending between the plurality of cross braces;
wherein the burner supports form a conveyor slot through which the conveyor belt can travel.

10. The roasting apparatus of claim 9 wherein the gas distribution assembly further comprises:
a gas source;
a master conduit connected to said gas source; and
an output conduit connecting said master conduit to said at least one burner.

* * * * *